US009281175B2

(12) United States Patent
Haufler et al.

(10) Patent No.: US 9,281,175 B2
(45) Date of Patent: Mar. 8, 2016

(54) FIRST AND SECOND ORDER FOCUSING USING FIELD FREE REGIONS IN TIME-OF-FLIGHT

(71) Applicant: DH Technologies Development Pte. Ltd., Singapore (SG)

(72) Inventors: Robert E. Haufler, Toronto (CA); William Morgan Loyd, Sugar Land, TX (US)

(73) Assignee: DH Technologies Development Pte. Ltd., Singapore (SG)

( * ) Notice: Subject to any disclaimer, the term of this patent is extended or adjusted under 35 U.S.C. 154(b) by 0 days.

(21) Appl. No.: 14/367,234

(22) PCT Filed: Dec. 6, 2012

(86) PCT No.: PCT/IB2012/002631

§ 371 (c)(1),
(2) Date: Jun. 19, 2014

(87) PCT Pub. No.: WO2013/093587

PCT Pub. Date: Jun. 27, 2013

(65) Prior Publication Data

US 2015/0014522 A1 Jan. 15, 2015

Related U.S. Application Data

(60) Provisional application No. 61/579,895, filed on Dec. 23, 2011.

(51) Int. Cl.
*H01J 49/40* (2006.01)
*H01J 49/00* (2006.01)
*B01D 59/44* (2006.01)
*H01J 49/02* (2006.01)

(52) U.S. Cl.
CPC ........... *H01J 49/405* (2013.01); *H01J 49/0027* (2013.01); *H01J 49/02* (2013.01); *H01J 49/406* (2013.01)

(58) Field of Classification Search
CPC ..... H01J 49/405; H01J 49/061; H01J 49/062; H01J 49/40; H01J 49/401; H01J 49/403
USPC .............. 250/287, 281, 282, 286, 396 R, 397
See application file for complete search history.

(56) References Cited

U.S. PATENT DOCUMENTS

| | | | | |
|---|---|---|---|---|
| 5,202,562 | A | 4/1993 | Koga et al. | |
| 5,955,730 | A * | 9/1999 | Kerley et al. | 250/287 |
| 6,570,152 | B1 | 5/2003 | Hoyes | |
| 6,781,121 | B1 | 8/2004 | Davis et al. | |
| 7,196,324 | B2 | 3/2007 | Verentchikov | |

(Continued)

*Primary Examiner* — Nikita Wells

(57) ABSTRACT

In some embodiments, a time of flight mass spectrometer can comprise an input orifice for receiving ions, a first ion accelerator stage for accelerating the ions along a first path, at least one ion reflector for receiving said accelerated ions and redirecting said ions along a second path different than the first path, a detector for detecting at least a portion of the ions redirected by said at least one ion reflector, and at least first and second field free drift regions disposed between said first acceleration stage and said detector, wherein said second field free region is disposed in proximity of the detector. In some embodiments, the lengths of the field free drift regions can be selected so as to provide 1st and 2nd order corrections of the time of flight of the ions with respect to variation in their initial positions.

15 Claims, 28 Drawing Sheets

(56) References Cited

U.S. PATENT DOCUMENTS

| | | | | |
|---|---|---|---|---|
| 7,663,100 | B2 * | 2/2010 | Vestal | 250/287 |
| 8,399,828 | B2 * | 3/2013 | Vestal | 250/285 |
| 2007/0176090 | A1 | 8/2007 | Verentchikov | |
| 2008/0272291 | A1 * | 11/2008 | Vestal | 250/287 |
| 2008/0272293 | A1 | 11/2008 | Vestal | |
| 2010/0193681 | A1 | 8/2010 | Vestal | |
| 2011/0155901 | A1 | 6/2011 | Vestal | |
| 2012/0145889 | A1 * | 6/2012 | Vestal | 250/282 |

* cited by examiner

Parameters for FIG 15 d1 = 20 mm V1 = 1500 V d2 = 3.2638889 mm V2 = 0 d3 = 25 mm V3 = -6000 V d4 = 339.375 mm dt = 48.2511997 ps resolution = 702971

Parameters for FIG 17A-C d1 = 20 mm V1 = 1499 V d2 = 3.36 mm V2 = 0 d3 = 31.5 mm V3 = -7000 V d4 = 385.67 mm resolution = 100741 dt = 59 ps

Parameters for FIG 18A-C

| | |
|---|---|
| d5 = 0.5 m | V1 = -7000 V |
| d6 = 0.084 m | V2 = -1000 V |
| d7 = 0.0672 m | V3 = 1884 V |
| d4 = 0.5416 m | dt_tof2 = 231 ps |
| | restof2 = 164575 |

Parameters for FIG 19

| | |
|---|---|
| d1 = 20 mm | V1 = 1500 V |
| d2 = 3.3607581 mm | V2 = 0 |
| d3 = 31.5 mm | V3 = -7000 V |
| d4 = 385.6672281 mm | V4 = -1000 V |
| d5 = 500 mm | V5 = 1882 V |
| d6 = 84 mm | c1 = 10 mm |
| d7 = 67.2 mm | mc = 80 us |
| d8 = 541.6 mm | dt = 35 ps |
| | resolution = 714907 |

FIRST AND SECOND ORDER FOCUSING USING FIELD FREE REGIONS IN TIME-OF-FLIGHT

RELATED APPLICATION

This application claims the benefit and priority of U.S. Provisional Application No. 61/579,895 filed Dec. 23, 2011, the entire teachings of which are incorporated herein by reference.

FIELD

Applicant's teachings are generally directed to time-of-flight ("TOF") mass spectrometry.

BACKGROUND

A TOF mass spectrometer can be employed to determine the mass-to-charge ratio of ions based on the time required for the ions to travel through a field free region to reach a detector. In practice, the resolution of a TOF spectrometer can be limited by a variety of factors, such as the initial positional distribution of ions along the TOF axis, the kinetic energy spread of ions as they enter the TOF spectrometer, and the length of field free region, among others. Although a number of advances have been made in improving the resolution of TOF spectrometers, there is still a need for further improvements.

SUMMARY

According to some aspects of the applicants' teachings, a time-of-flight ("TOF") mass spectrometer is disclosed, which can comprise an input orifice for receiving ions, a first ion acceleration stage for accelerating the ions along a first path, at least one ion reflector (herein also referred to as an "ion mirror" or a "reflectron") for receiving the accelerated ions and redirecting the ions along a second path different than the first path, and a detector for detecting at least a portion of the ions redirected by the ion reflector. The TOF mass spectrometer can further comprise at least first and second field free drift regions disposed between the first acceleration stage and the detector, wherein the second field free region is disposed in proximity of the detector.

In some embodiments, at least one ion reflector can comprise first and second ion reflectors, wherein the first ion reflector is configured to reflect the ions propagating along the first path onto the second path and the second ion reflector is configured to reflect the ions propagating along the second path onto a third path. In some such embodiments, the detector is positioned to receive the ions propagating along the third path.

In some embodiments, the second field free drift region has a length that is greater than that of the first field free region. Further, in some embodiments, the first acceleration stage can comprise first and second electrodes separated by a selected distance, wherein the application of a voltage differential between the two electrodes generates an electric field for accelerating the ions. The second electrode would be a grid in order to allow the ions to pass through. In some embodiments, a third electrode, also a grid, can be disposed at a distance relative to the second electrode, where the second and third electrodes are held at a common voltage to generate said first field free drift region there between.

In some embodiments, a third grid can be disposed between the third electrode/second grid and the first ion reflector, where the third electrode/second grid and the third grid are held at a voltage differential to provide a second acceleration stage for ions traveling along the first path. Further, the third grid which is also the entrance grid to the first ion reflector can be held at a voltage differential configured to decelerate the ions as they propagate into ion reflector from the third grid and to accelerate in the reverse direction as they propagate through the first ion reflector back to the third grid along the second path.

In some embodiments, the third grid can be configured such that the ions intersect the grid as they propagate along the second path from the first ion reflector to the second ion reflector. In this case, the same grid is also the entrance grid to the second reflector.

In some embodiments, the third grid and the second ion reflector are held at a voltage differential configured to cause the ions to decelerate as they propagate along the second path from the grid into the second ion reflector, where the second ion reflector is configured to redirect the ions along the third path back toward the grid. The voltage differential between the second ion reflector and the grid can cause the ions to accelerate as they move from the second ion reflector to the grid along the third path.

In some embodiments, the second field free drift region can extend from the grid to the detector.

In some embodiments, the length of the first field free drift region (d2) is provided by the Equation (4) presented further below, and the length of the second field free drift region (d6) is provided by Equation (5) presented further below.

In some embodiments, a second grid is disposed between the first grid and the first ion reflector at a distance (dff) from the first grid, wherein the first and the second grids are held at a common voltage to generate a third field free drift region therebetween. In some such embodiments, the length of the first field free drift region (d2) is provided by Equation (11) below, the length of the second field free drift region (d6) is provided by Equation (12) below based on a choice for the length of the third field free drift region (dff).

According to further aspects of the applicant's teachings, a time-of-flight mass spectrometer is disclosed, which can comprise a first ion acceleration stage for accelerating ions received through an input aperture (orifice), a first field free drift region for receiving the accelerated ions from the first acceleration stage, a second ion acceleration stage for accelerating ions exiting said first field free drift region, a second field free drift region for receiving the accelerated ions from the second acceleration stage, and a detector for receiving ions after their passage through the second field free drift region, wherein the field free drift regions are configured to ensure that the first and second derivatives of time-of-flight of ions through the spectrometer relative to a starting position of the ions vanish.

In some embodiments of the above time-of-flight mass spectrometer, the input aperture can be configured to receive ions in a direction orthogonal to a longitudinal axis of the spectrometer. Further, in some embodiments, a first electrode can be disposed in proximity of the aperture and can be configured to apply a voltage (e.g., a voltage pulse) to the entering ions to cause their deflection onto the longitudinal axis. In some embodiments, a second electrode can be disposed at a distance (d1) relative to the first electrode, where a voltage differential between the first and second electrodes provides the first ion acceleration stage. The second electrode would be a grid to allow the ions to pass through. In some embodiments, a third electrode, which can also be a grid, is disposed at a distance (d2) relative to the second electrode/grid, wherein the second and third electrodes/grids are held at a common voltage to generate said first field free drift region in a space therebetween. In some embodiments, a fourth electrode (which can also be a grid) can be disposed at a distance (d3) relative to the third electrode, wherein a voltage differential between the third and fourth electrodes (grids) generates said second ion acceleration stage. In some embodiments, the second field free drift region has a length (d4) and extends from the third electrode to the detector. In some embodiments, the length (d2) of the first field free drift region is provided by Equation (13) below, and the length (d4) of the second field free drift region is provided by Equation (14) below.

According to further aspects of the applicant's teachings, a method of performing time-of-flight (TOF) is disclosed, which can comprise providing one or more ion acceleration stages between an ion entrance aperture and an ion detector, providing two or more field free drift regions between the entrance aperture and the detector, wherein at least one of said field free drift regions is disposed between one of the acceleration stages and the detector, and selecting the lengths of said field free drift regions such that first and second derivatives of time-of-flight of the ions traveling from an initial ion position to said detector relative to said initial position vanish.

In some embodiments, in the above method, the length of one of the field free drift regions can be selected in accordance with Equation (18), and the length of the other field free drift region is selected in accordance with Equation (19).

In further aspects, a time-of-flight (TOF) mass spectrometer is disclosed, which can comprise an aperture for receiving a plurality of ions, at least one ion acceleration stage for accelerating the received ions along a first path, and two or more field free drift regions configured to provide spatial focusing of the accelerated ions at a selected location. The mass spectrometer can further comprise at least one ion reflector for receiving the ions from the spatial focusing location and for redirecting the ions along a second path different than the first path. The ion reflector can be configured to reduce the kinetic energy spread of the ions.

In some embodiments, in the above TOF mass spectrometer, the two or more field free drift regions can be configured to provide second order correction of ion flight time relative to an initial ion position so as to provide said spatial focusing of the ions.

In some embodiments, the ion reflector can be configured to provide second order correction of the variation in the kinetic energy of the ions at said spatial focusing location. In some embodiments, the ion reflector can comprise a multi-stage, e.g., a two-stage, ion reflector.

In some embodiments, the lengths of two field free drift regions (d2 and d4 utilized to correct for variation in the initial ion position can be obtained by employing Equations (36) and (37) provided below. In some such embodiments, a two-stage ion reflector can be employed for correcting variation in the kinetic energy of the ions, where the parameters of the ion reflector can be selected by employing Equations (57) and (58) provided below.

BRIEF DESCRIPTION OF THE DRAWINGS

The skilled person in the art will understand that the drawings, described below, are for illustration purposes only. The drawings are not intended to limit the scope of the applicant's teachings in any way.

DESCRIPTION OF VARIOUS EMBODIMENTS

In some embodiments, time-of-flight ("TOF") mass spectrometry analyzers are disclosed that can employ two or more field free drift regions to provide at least first and second order corrections of ion flight time with respect to a variation in ion initial position. In some embodiments, the lengths of the field free drift regions can be calculated based on the mathematical relations provided below. Further, in some embodiments, a TOF mass spectrometer is disclosed that employs two or more field free drift regions for providing positional focusing of ions at a selected distance from an ion reflector, where the ion reflector can be employed to reduce the effect on the flight time distribution caused by the kinetic energy spread of the ions before they reach a detector. Various terms and phrases employed herein to describe exemplary embodiments according to the applicants' teachings are used consistent with their ordinary meanings in the art. In particular, the term "field free drift region" as used herein refers to a region in which the electric field component along the direction of motion of ions has a magnitude below a given threshold of 2000 V/m, and in many embodiments, the electric field component in a field free drift region along the direction of motion of the ions vanishes. Furthermore, the terms "ion reflector", "ion mirror" and "reflectron" are used interchangeably according to their common meaning in the art to refer to a device configured to reverse the direction of travel of an ion in a mass spectrometer.

Figure 1:
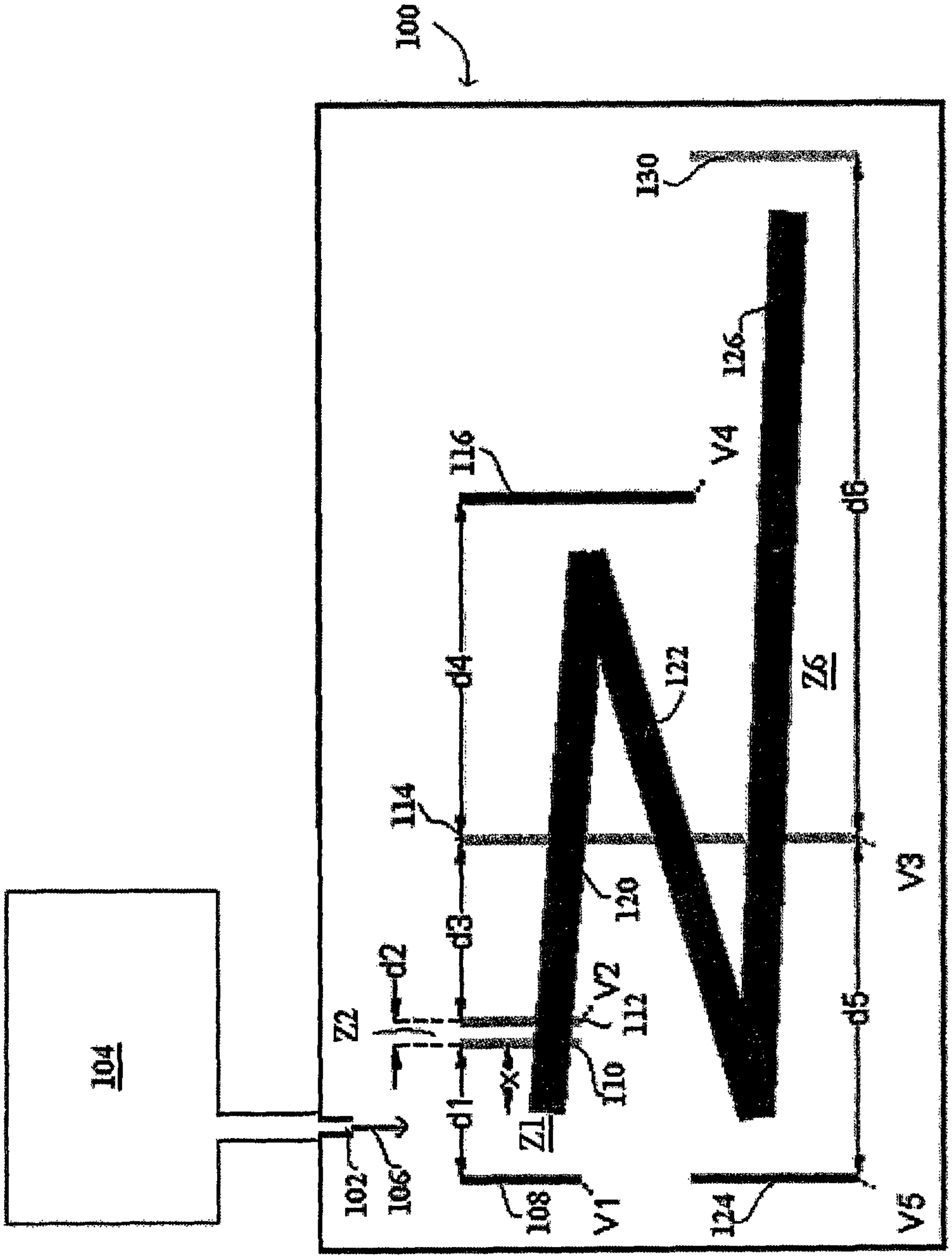
FIG. 1 is a schematic representation of a time of flight mass spectrometer according to an embodiment of the applicants' teachings.

FIG. 1 schematically depicts an embodiment of a time of flight (TOF) mass spectrometer 100 according to the applicant's teachings that includes an orifice (aperture) 102 for receiving ions from an upstream unit 104. In some cases, the TOF spectrometer 100 can receive ions directly from an ion source, e.g., an electrospray ionization ("ESI") source, a desorption electrospray ionization ("DESI") source, or a sonic spray ionization ("SSI") source, among others. In other cases, the TOF spectrometer 100 can receive ions that have undergone various stages of filtering, fragmentation, and/or trapping. By way of example, in some implementations, the upstream unit can comprise an ion source 104. Ions generated by the ion source 104 can enter the TOF spectrometer 100 for mass analysis.

Referring again to FIG. 1, the ions enter the mass spectrometer along a direction 106, which as discussed below, can be substantially orthogonal to an axial direction (herein also referred to as the "longitudinal direction") of the spectrometer (herein denoted as the AD direction). In particular, the mass spectrometer 100 can comprise an electrode 108, e.g., in the form of a plate, to which a voltage (e.g., a pulse voltage) can be applied to cause a 90 degree change in the propagation direction of the ions entering the spectrometer. The spectrometer can comprise two additional electrodes 110 and 112, which are separated from one another by a distance d2 and are held at a common DC voltage V2. The electrodes 110 and 112 can be implemented in a variety of ways. For example, they can be in the form of plates having central openings through which ions can pass. In the following description, the location of an ion in the spectrometer relative to a reference point (e.g., the electrode 108) is denoted by x.

The pair of electrodes 108 and 110 provides a first ion acceleration stage Z1 for the ions. In particular, a voltage differential (V2−V1) between the electrodes 108 and 110 causes acceleration of the ions toward the electrode 110 and into a space between the electrodes 110 and 112. Electrodes 110 and 112 would be grids or would have slits in order to allow the ions to pass through. As the electrodes 110 and 112 are held at a common voltage, the space between these two electrodes is a field free drift region Z2. In other words, there is no axial electric field in the region between the electrodes 110 and 112, thus allowing the ions to drift in this region without being subjected to accelerating or decelerating forces. It should be understood that in the vicinity of the openings of the electrodes 108 and 112, there can be fringing field that would have axial components. However, in many embodiments, the spacing d2 between the electrodes 110 and 112 can be much greater than the openings in the electrodes such that any fringing fields, if present, would have negligible effect in the propagation of the ions within this first field free drift region. As discussed in more detail below, this field free drift region is the first of two field free drift regions that are provided in this exemplary TOF spectrometer 100.

With continued reference to FIG. 1, a grid 114 can be disposed between the electrode 112 and an ion mirror 116. In this embodiment, the grid 114 can be held at a DC voltage V3 different than V2 so as to accelerate the ions that leave the field free drift region Z2, e.g., via an opening in the electrode 112. In other words, the voltage differential between the grid 114 and the electrode 112 provides a second ion acceleration stage. On the other hand, as the ions pass through the grid 114, a decelerating electric field present between the ion mirror 116 and the grid cause the ions to decelerate, come to a stop, and be reflected by the ion mirror 116 back toward the grid 114.

The ion mirror 116 can be implemented in a variety of ways. In this exemplary embodiment, the ion mirror 116 can be implemented as a single stage ion mirror that can be held at a voltage (e.g., DC voltage) V4. The mirror 116 causes the ions to change their propagation path from their initial path 120 to a different path 122.

In this illustrative embodiment, the grid 114 can be configured to intersect the ions not only as they leave the field free drift region Z2 propagating along the path 120 but also as they propagate along the path 122 subsequent to their reflection by the ion mirror 116. More specifically, the ions are accelerated subsequent to their reflection by the ion mirror 116 toward the grid 114. In other words, the electric field established between the grid 114 and the ion mirror 116 causes deceleration of the ions as they move toward the ion mirror 116, but cause acceleration of the ions as they move away from the ion mirror 116 toward the grid 114.

In this illustrative embodiment, the spectrometer 100 can further comprise another ion mirror 124 that receives ions that are reflected by the first ion mirror after their passage through the grid 114 as they propagate along the path 122. In this embodiment, similar to the first ion mirror 116, the second ion mirror 124 can be a single stage ion mirror. The second ion mirror 124 can be held at a voltage V5, which can be the same or different from the voltage V4 at which the first ion mirror 116 can be held. The voltage differential between the second ion mirror 124 and the grid 114 causes deceleration of the ions as they move along the path 122 from the grid 114 to the second ion mirror 124. The second ion mirror 124 reflects these ions onto a third path 126. As the reflected ions move along the path 126, the electric field between the grid 114 and the second mirror 124 causes their acceleration. Upon passing through the grid 114, the ions reflected by the second ion mirror 124 enter a second field free drift region Z6 having a length d6. A detector 130 can be disposed at the end of the second field free drift region Z6 to detect the ions.

The lengths of the two field free drift regions (d2, d6) can be determined, as discussed below, to provide $1^{st}$ and $2^{nd}$ order corrections of ion flight time with respect to the initial ion position. In other words, the two field free regions can be configured to provide position focusing of the ions. In some embodiments, the following mathematical relations are employed to derive values for the lengths d2 and d6:

In the equations outlined in this specification, the use of the ellipsis ( . . . ) indicates that the equation is continued on the following line. The use of the ellipsis is not an indication that a portion of the equation has been intentionally omitted. In addition, in some instances, lines of equations which have been indented are continuations of the immediately preceding line.

Equation 1

$$tof(x) = \frac{mass}{q}\cdot\left(\frac{1}{E1}-\frac{1}{E3}\right)\cdot\left(v1^2+2\cdot\frac{q}{mass}\cdot x\cdot E1\right)^{\frac{1}{2}} - \frac{mass}{q}\cdot\frac{1}{E1}\cdot v1 + \ldots \frac{mass}{q}\cdot\left(\frac{1}{E3}-\frac{4}{E5}\right)\cdot\left[v1^2+2\cdot\frac{q}{mass}\cdot(x\cdot E1+d3\cdot E3)\right]^{\frac{1}{2}} + \ldots d2\cdot\left(v1^2+2\cdot\frac{q}{mass}\cdot x\cdot E1\right)^{-\frac{1}{2}} + \ldots d6\cdot\left[v1^2+2\cdot\frac{q}{mass}\cdot(x\cdot E1+d3\cdot E3)\right]^{-\frac{1}{2}}$$

-continued

Equation 2

$$\frac{\partial TOF(x)}{\partial x} = E1\cdot\left(\frac{1}{E3}-\frac{4}{E5}\right)\cdot\left[v1^2+2\cdot\frac{q}{mass}\cdot(x\cdot E1+d3\cdot E3)\right]^{-\frac{1}{2}} + \ldots E1\cdot\left(\frac{1}{E1}-\frac{1}{E3}\right)\cdot\left[v1^2+2\cdot\frac{q}{mass}\cdot x\cdot E1\right]^{-\frac{1}{2}} - \ldots 3\cdot\frac{q}{mass}\cdot E1\cdot d6\cdot\left[v1^2+2\cdot\frac{q}{mass}\cdot(x\cdot E1+d3\cdot E3)\right]^{-\frac{3}{2}} - \ldots \frac{q}{mass}\cdot E1\cdot d2\cdot\left[v1^2+2\cdot\frac{q}{mass}\cdot x\cdot E1\right]^{-\frac{3}{2}}$$

Equation 3

$$\frac{\partial^2 TOF(x)}{\partial x^2} = 9\cdot\left(\frac{q}{mass}\right)^2\cdot E1^2\cdot d6\cdot\left[v1^2+2\cdot\frac{q}{mass}\cdot(x\cdot E1+d3\cdot E3)\right]^{-\frac{5}{2}} + \ldots 3\cdot\left(\frac{q}{mass}\right)^2\cdot E1^2\cdot d2\cdot\left[v1^2+2\cdot\frac{q}{mass}\cdot x\cdot E1\right]^{-\frac{5}{2}} - \ldots E1^2\cdot\left(\frac{q}{mass}\right)\cdot\left(\frac{1}{E3}-\frac{4}{E5}\right)\cdot\left[v1^2+2\cdot\frac{q}{mass}\cdot(x\cdot E1+d3\cdot E3)\right]^{-\frac{3}{2}} - \ldots E1^2\cdot\left(\frac{q}{mass}\right)\cdot\left(\frac{1}{E1}-\frac{1}{E3}\right)\cdot\left[v1^2+2\cdot\frac{q}{mass}\cdot x\cdot E1\right]^{-\frac{3}{2}}$$

Equation 4

$$d2 = \frac{d1\cdot E1}{3\cdot d3\cdot E3}\cdot\left[\left(\frac{4}{E5}-\frac{1}{E3}\right)\cdot\frac{(d1\cdot E1)^{\frac{3}{2}}}{(d1\cdot E1+2\cdot d3\cdot E3)^{\frac{1}{2}}} + \left(\frac{1}{E3}-\frac{1}{E1}\right)\cdot(d1\cdot E1-d3\cdot E3)\right]$$

Equation 5

$$d6 = \frac{d1\cdot E1+2\cdot d3\cdot E3}{9\cdot d3\cdot E3}\ \ldots\cdot\left[\frac{(d1\cdot E1+2\cdot d3\cdot E3)^{\frac{3}{2}}}{(d1\cdot E1)^{\frac{1}{2}}}\cdot\left(\frac{1}{E1}-\frac{1}{E3}\right) + (d1\cdot E1+3\cdot d3\cdot E3)\cdot\left(\frac{1}{E3}-\frac{4}{E5}\right)\right]$$

wherein in the above Eq. (1) and Eq. (2):

x denotes an initial ion position along the ion path (e.g., TOF axis) relative to a reference (e.g., relative to the electrode 108), mass denotes the ion mass, q denotes the electric charge of an electron, v1 denotes the initial ion velocity along the TOF axis, E1 denotes the electric field in the first stage of acceleration, as defined by Equation 6

$$E1 = \frac{v1 - v2}{d1},$$

E3 denotes the electric field in the second ion accelerator stage as defined by

Equation 7

$$E3 = \frac{v2 - v3}{d3},$$

E4 denotes the electric field in the $1^{st}$ single stage ion mirror, E4=E5 for equations 1-5 above.

E5 denotes the electric field in the $2^{nd}$ single stage ion mirror as defined by d4 d2 denotes the length of the 1st field free drift region, d3 denotes the length of the 2nd ion accelerator stage, and d6 denotes the length of the 2nd field free drift region.

In various embodiments, the two ion mirrors are identical, as reflected in the above equations. In alternative embodiments, the two ion mirrors can be different. In other words, the dimensions and the fields generated by the two ion mirrors can be different. In some embodiments, such differences can be employed to provide higher order corrections or additional energy corrections.

Figure 2A:
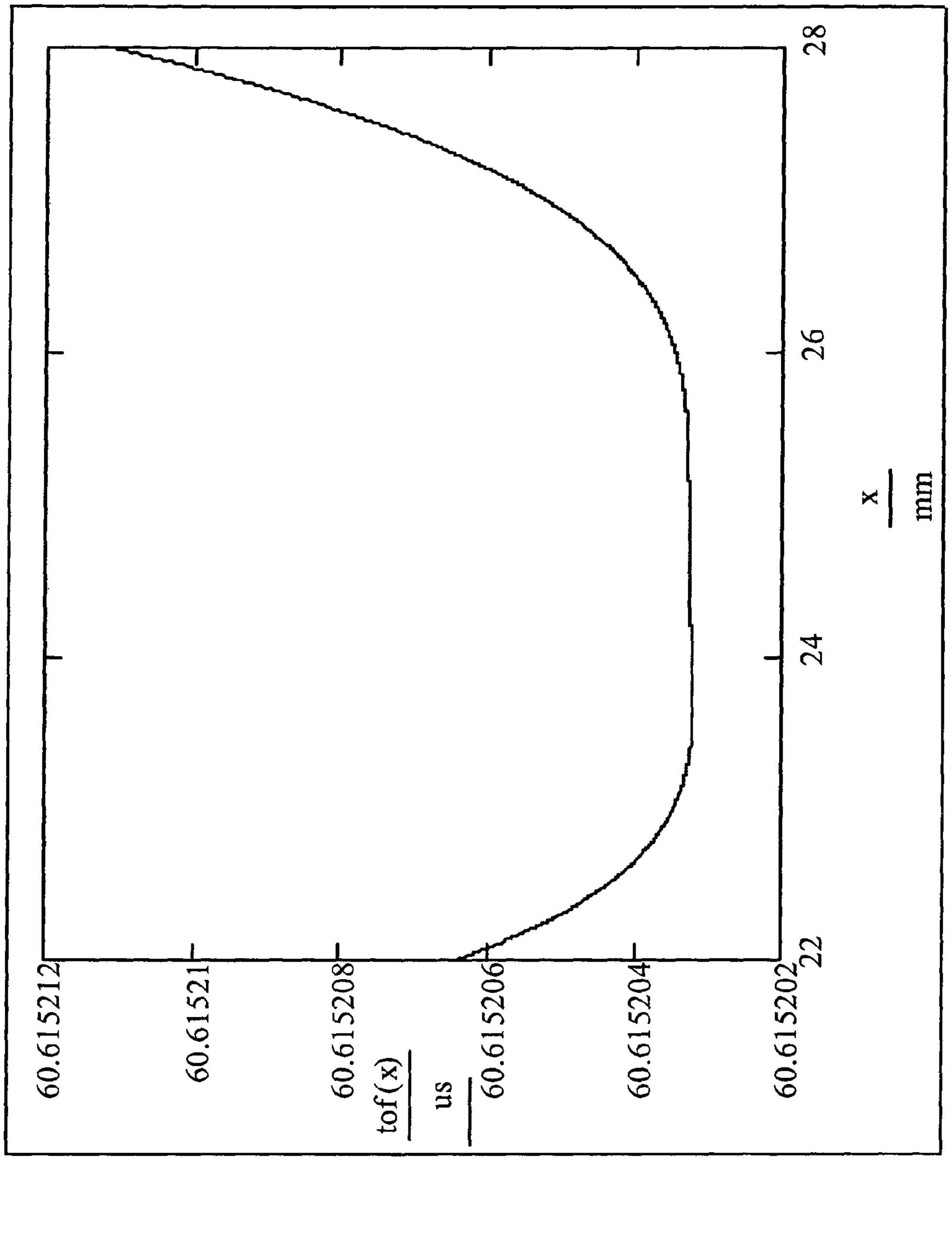
FIG. 2A shows theoretically calculated time-of-flight (TOF) as a function of the ion initial position for an 829 amu ion in a simulated TOF based on the TOF embodiment depicted in FIG. 1.
Figure 2B:
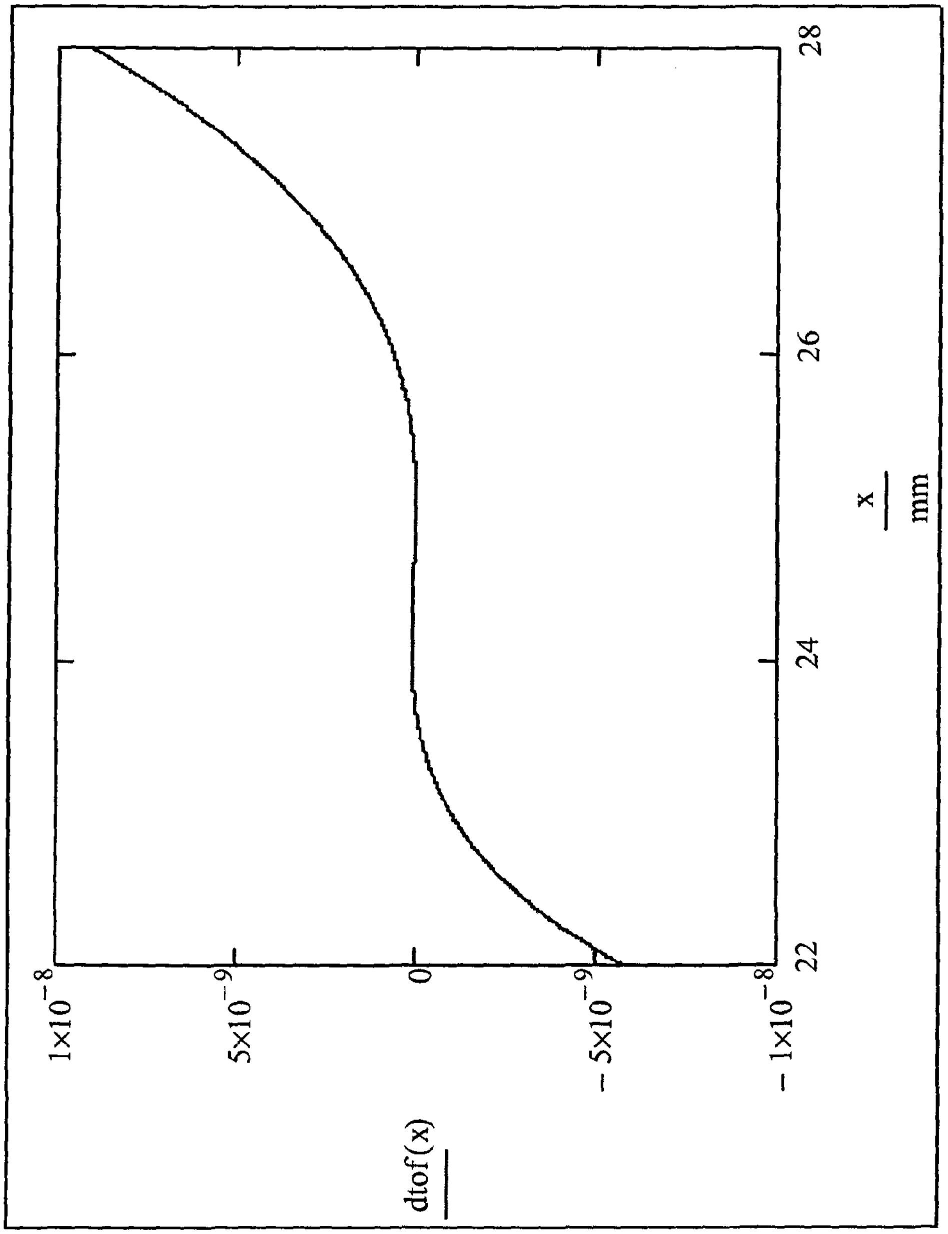
FIG. 2B shows theoretically calculated first derivative of TOF relative to the initial ion position in the simulated TOF mentioned above in connection with FIG. 2A.
Figure 2C:
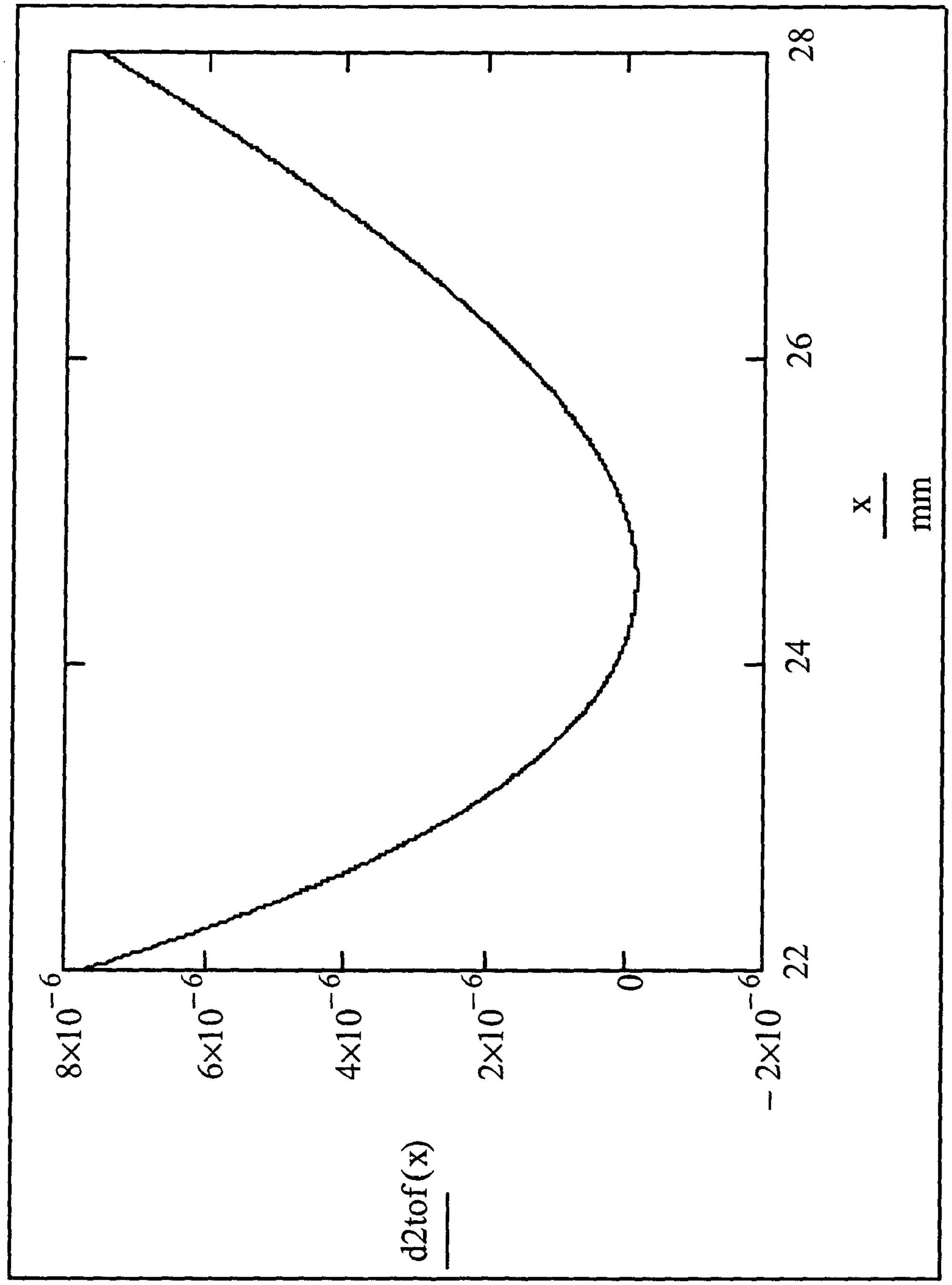
FIG. 2C shows theoretically calculated second derivative of TOF relative to the initial ion position in the simulated TOF mentioned above in connection with FIG. 2A.

To illustrate the use of the above mathematical relations in providing 1st and 2nd order corrections, FIG. 2A shows calculated time-of-flight (TOF) as a function of the ion initial position (which was selected to range from 21 mm to 29 mm relative the electrode 108) for an 829 amu ion in the above TOF 100 with d2=6.74 mm and d6=1.752 mm, the ion mirror lengths were chosen to be 100 mm and the total ion flight distance was 2.23 m. FIGS. 2B and 2C show, respectively, the first derivative of TOF relative to the ion position along the ion path (dTOF/dx), as well as the second derivative of TOF relative to the ion position along the ion path ($d^2TOF/dx^2$). The beam width was assumed to be 8 mm (w=8 mm). The values of the other parameters are shown in FIGS. 2A-2C, and include d1=50 mm, d3=50 mm, d4=100 mm, d5=100 mm, V1=2000 V, V3=−8100 V, V4=1100 V, V5=1100 V, E1=40 V/mm, E3=162 V/mm, E4=−92 V/mm, E5=−92 V/mm, res=1413897.84, delta t=21.49 ps, L(Overall Distance)=1.86 m.

FIGS. 2A-2C show that the ion flight time traces a quartic function as the value of x ranges over the beam width (8 mm in this example). This shows that not only a first order and a second order, but also a third order correction, were achieved, though d2 and d6 were not explicitly selected to provide 3rd order correction. In many cases, a 3rd order correction is not necessary given the limitations of the detector, HV (high voltage) stability, and signal acquisition technology. However, if needed, the 3rd order correction can be taken into account in the context of the above mathematical formalism.

As shown in FIGS. 2A and 2B, the 1st and 2nd order corrections provide a wide and flat region for the initial ion locations (e.g., in this case between 24 and 26 mm relative to the electrode 108) in which the first and second derivatives of TOF relative to ion position vanish. Given the idealized conditions of no variation anywhere except ion position and no initial kinetic energy along the TOF longitudinal axis, this TOF can theoretically focus an 8 mm wide ion beam into a 21 ps wide ion flight time distribution (all inclusive, not FWHM), thereby providing a resolution of 1.4 million (mass/Δmass, Δmass=max−min, not FWHM).

Figure 3:
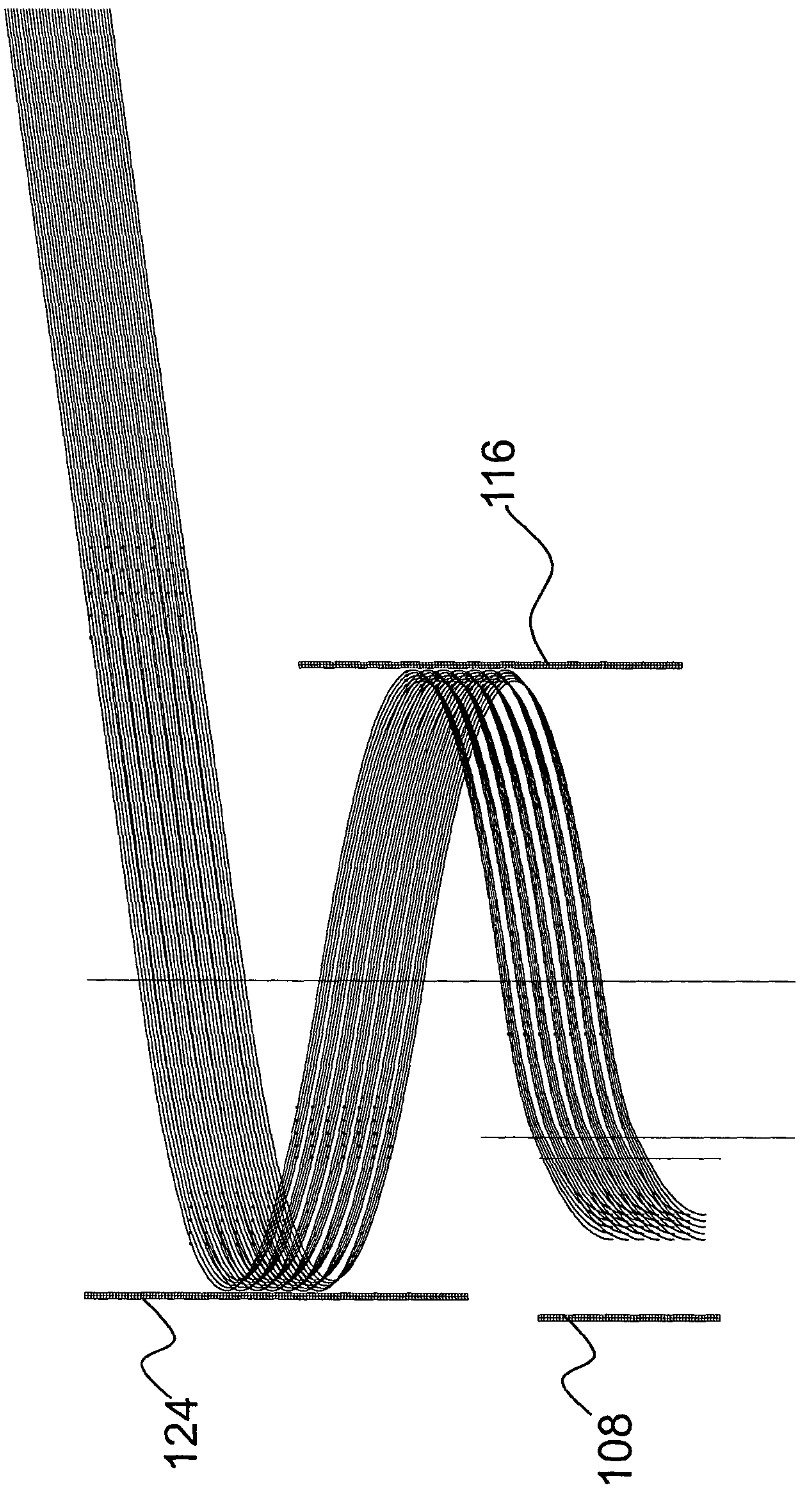
FIG. 3 shows simulated ion trajectory in the simulated TOF mentioned above in connection with FIG. 2A.
Figure 4:
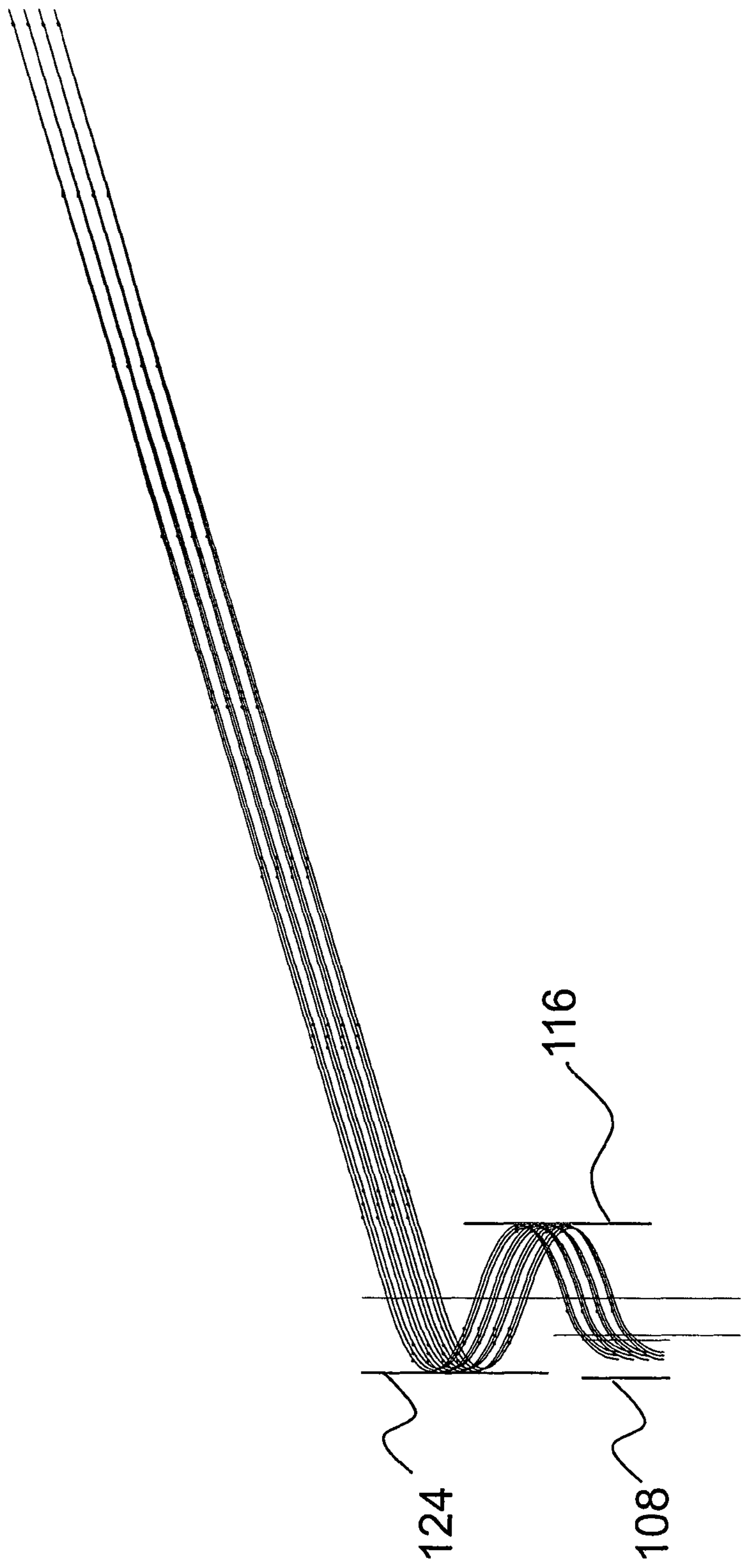
FIG. 4 shows simulated spatial focusing of the ions in the simulated TOF mentioned above in connection with FIG. 2A.
Figure 5:
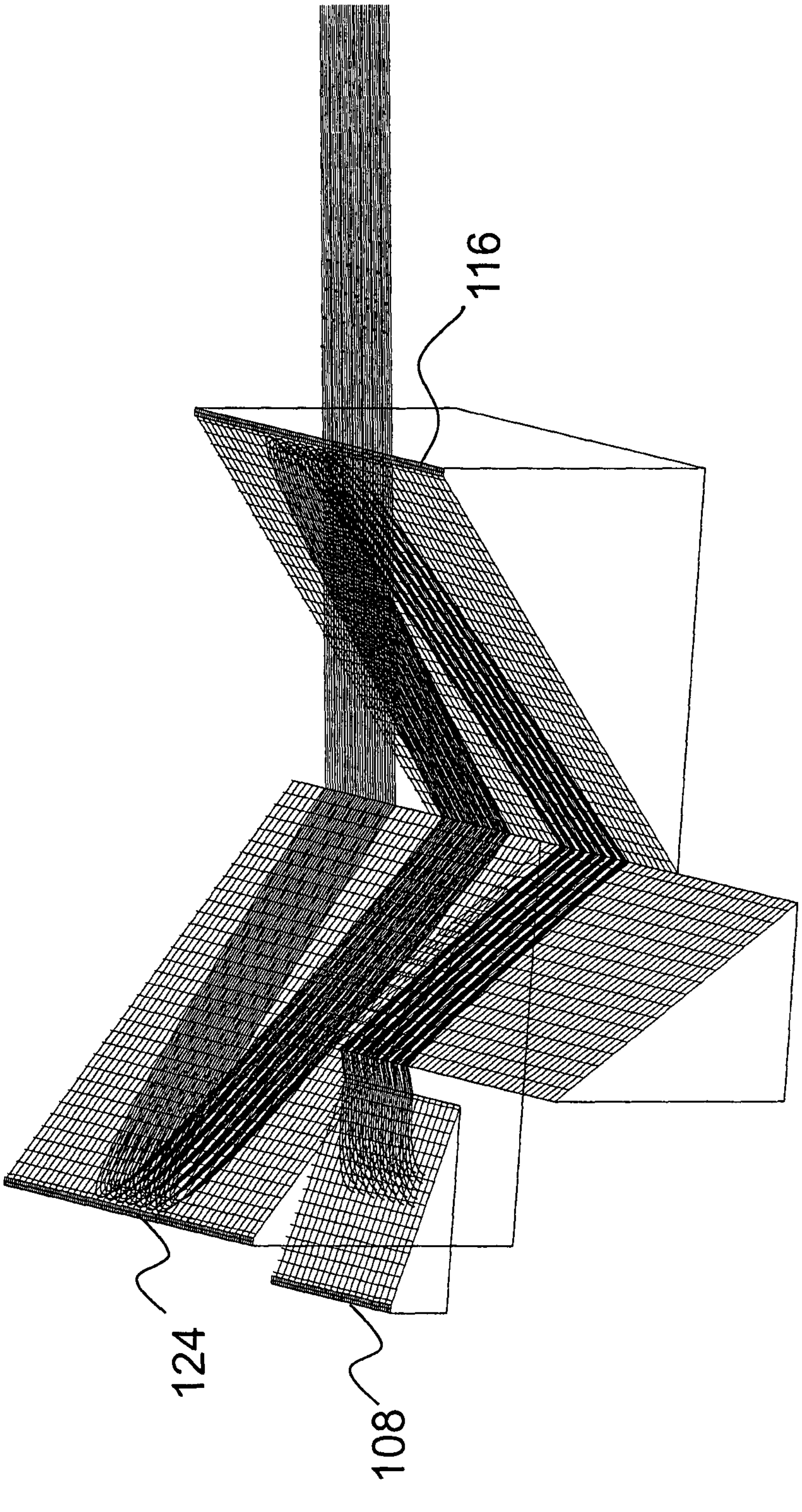
FIG. 5 shows simulated potential energy of a plurality of ions along their trajectories in the simulated TOF mentioned above in connection with FIG. 2A.

FIG. 3 shows simulated ion trajectory in this illustrative TOF spectrometer in the ion acceleration and ion mirror sections and FIG. 4 shows ion trajectories to the focus point (the long field free trajectory was at an angle of 10.5 degrees relative to the longitudinal axis of the spectrometer). FIG. 5 shows simulated potential energy of the ions along their trajectories as they pass through the TOF 100. The simulations were done with ion orthogonal kinetic energy of 200 eV as the ions enter the spectrometer. Although the initial positions of the ions along the TOF axis was simulated to be at different locations, the ions were tightly focused at the detector.

Figure 6:
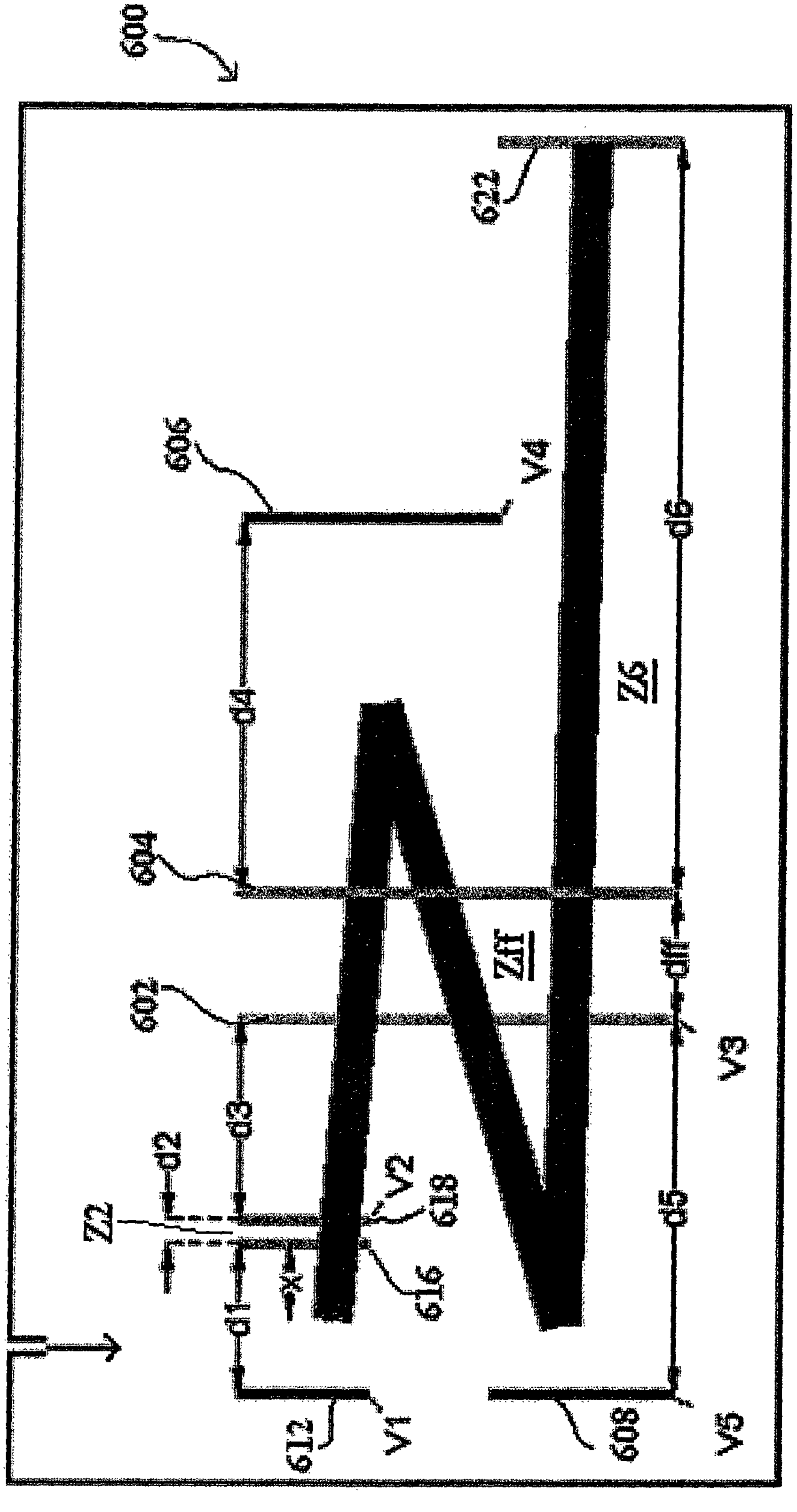
FIG. 6 is a schematic representation of another embodiment of a TOF spectrometer according to the applicants' teachings.

FIG. 6 schematically depicts a TOF spectrometer 600 according to another embodiment of the invention that varies from the embodiment of FIG. 1 in that it includes an additional field free region. More specifically, in various embodiments, two grids 602 and 604 are disposed between the two ion mirrors 606 and 608. The grids 602 and 604 are held at a common voltage V3 so as to generate a field free drift region Zff between the grids. Similar to the previous embodiment, a voltage V1 (e.g., a pulse voltage) applied to the electrode 612 causes the ions entering the spectrometer to be redirected toward the first field free drift region Z2 while being accelerated by the voltage differential (V2−V1) applied between the electrodes 616 and 618. After leaving the field free region Z2, the ions are accelerated toward the grid 602 via the voltage differential (V3−V2) applied between the grid 602 and the electrode 618. The ions then pass through the second field free drift region Zff and continue to propagate toward the ion mirror 606. The voltage differential between the ion mirror 606 and the grid 604 (V4−V3) decelerates the ions as they propagate toward the ion mirror 606, which causes the reflection of the ions back toward the grid 604. The reflected ions are accelerated as they move from the ion mirror 606 to the grid 604. The reflected ions pass through the field free drift region Zff established between the two grids 602 and 604 and propagate toward the second ion mirror 608. The ions are decelerated as they move toward the second ion mirror 608 and are reflected by that ion mirror back toward the field free drift region Zff between the two grids 602 and 604. After passage through the field free region Zff, they enter a long field free drift region Z6 having a length d6 that extends to a detector 622. In various embodiments, as shown here, both ion mirrors can be single stage mirrors, though in other embodiments one or both of the ion mirrors can be multistage (e.g., two-stage) ion mirrors. In some implementations of this embodiment, the length of the final field free drift region (d6) can be shorter than the corresponding length of the respective field free drift region in the TOF 100 of other embodiments. By way of example, in some embodiments, for each mm length of the additional field free region Zff, the final field free region Z6 can be shortened by 3 mm.

The lengths of the field free regions Z2 and Z6 (d2 and d6) can be determined by employing the following mathematical relations in which dff is a parameter. By choosing a value of dff, the mathematical Equations (11) and (12) can be used to obtain values for the lengths d2 and d6. In some cases, an initial choice for dff may not yield reasonable values for d2 and d6 (e.g., they may not be positive values). In such cases, other values for dff can be iteratively selected until reasonable values for d2 and d6 are obtained. As in the previous embodiment, the first derivative of TOF with respect to ion position (x) can be employed to obtain a value of d6, and the second derivative of TOF with respect to ion position (x) can be employed to obtain a value for d2. The value of d2 can be independent of d6 and dff while the value of d6 depends on d2 and dff.

Equation 8

$$tof(x) = \frac{\text{mass}}{q}\cdot\left(\frac{1}{E1}-\frac{1}{E3}\right)\cdot\left(v1^2+2\cdot\frac{q}{\text{mass}}\cdot x\cdot E1\right)^{\frac{1}{2}} - \frac{\text{mass}}{q}\cdot\frac{1}{E1}\cdot v1 + \ldots\ \frac{\text{mass}}{q}\cdot\left(\frac{1}{E3}-\frac{4}{E5}\right)\cdot\left[v1^2+2\cdot\frac{q}{\text{mass}}\cdot(x\cdot E1+d3\cdot E3)\right]^{\frac{1}{2}} + \ldots\ d2\cdot\left(v1^2+2\cdot\frac{q}{\text{mass}}\cdot x\cdot E1\right)^{-\frac{1}{2}} + \ldots\ (3\cdot dff+d6)\cdot\left[v1^2+2\cdot\frac{q}{\text{mass}}\cdot(x\cdot E1+d3\cdot E3)\right]^{-\frac{1}{2}}$$

-continued

Equation 9

$$\frac{\partial TOF(x)}{\partial x} = E1\cdot\left(\frac{1}{E3}-\frac{4}{E5}\right)\cdot\left[v1^2+2\cdot\frac{q}{\text{mass}}\cdot(x\cdot E1+d3\cdot E3)\right]^{-\frac{1}{2}} + \ldots E1\cdot\left(\frac{1}{E1}-\frac{1}{E3}\right)\cdot\left[v1^2+2\cdot\frac{q}{\text{mass}}\cdot x\cdot E1\right]^{-\frac{1}{2}} - \ldots 3\cdot\frac{q}{\text{mass}}\cdot E1\cdot(3\cdot dff+d6)\cdot\left[v1^2+2\cdot\frac{q}{\text{mass}}\cdot(x\cdot E1+d3\cdot E3)\right]^{-\frac{3}{2}} - \ldots \frac{q}{\text{mass}}\cdot E1\cdot d2\cdot\left[v1^2+2\cdot\frac{q}{\text{mass}}\cdot x\cdot E1\right]^{-\frac{3}{2}}$$

Equation 10

$$\frac{\partial^2 TOF(x)}{\partial x^2} = 9\cdot\left(\frac{q}{\text{mass}}\right)^2\cdot E1^2\cdot(3\cdot dff+d6)\cdot\left[v1^2+2\cdot\frac{q}{\text{mass}}\cdot(x\cdot E1+d3\cdot E3)\right]^{-\frac{5}{2}} + \ldots 3\cdot\left(\frac{q}{\text{mass}}\right)^2\cdot E1^2\cdot d2\cdot\left[v1^2+2\cdot\frac{q}{\text{mass}}\cdot x\cdot E1\right]^{-\frac{5}{2}} - \ldots E1^2\cdot\left(\frac{q}{\text{mass}}\right)\cdot\left(\frac{1}{E3}-\frac{4}{E5}\right)\cdot\left[v1^2+2\cdot\frac{q}{\text{mass}}\cdot(x\cdot E1+d3\cdot E3)\right]^{-\frac{3}{2}} - \ldots E1^2\cdot\left(\frac{q}{\text{mass}}\right)\cdot\left(\frac{1}{E1}-\frac{1}{E3}\right)\cdot\left[v1^2+2\cdot\frac{q}{\text{mass}}\cdot x\cdot E1\right]^{-\frac{3}{2}}$$

Equation 11

$$d2 = \frac{E1\cdot d1}{3\cdot E3\cdot d3}\cdot\left[(E3\cdot d3-E1\cdot d1)\cdot\left(\frac{1}{E1}-\frac{1}{E3}\right) - \frac{(E1\cdot d1)^{\frac{3}{2}}}{(E1\cdot d1+2\cdot E3\cdot d3)^{\frac{1}{2}}}\cdot\left(\frac{1}{E3}-\frac{4}{E5}\right)\right]$$

Equation 12

$$d6 = \frac{d1\cdot E1+2\cdot d3\cdot E3}{9\cdot d3\cdot E3}\ldots\cdot\left[\frac{(d1\cdot E1+2\cdot d3\cdot E3)^{\frac{3}{2}}}{(d1\cdot E1)^{\frac{1}{2}}}\cdot\left(\frac{1}{E1}-\frac{1}{E3}\right) + (d1\cdot E1+3\cdot d3\cdot E3)\cdot\left(\frac{1}{E3}-\frac{4}{E5}\right)\right] - 3\cdot dff$$

Equation 13

$$d2 = \frac{d1}{3}\cdot\left[\left(\frac{d1\cdot E1}{d3\cdot E3}-1\right)\cdot\left(\frac{2\cdot E1}{E3}-1\right)\right]$$

Equation 14

$$d4 = \frac{1}{3}\cdot\left(\frac{1}{E1}-\frac{2}{E3}\right)\cdot\frac{(E1\cdot d1+2\cdot E3\cdot d3)^{\frac{5}{2}}}{E3\cdot d3\cdot(E1\cdot d1)^{\frac{1}{2}}}$$

wherein in the above Equations 8-14:

x denotes an initial ion position along the ion path (e.g., TOF axis) relative to a reference (e.g., relative to the electrode 612), mass denotes the ion mass, q denotes the electric charge of an electron, v1 denotes the initial ion velocity along the TOF axis, E1 denotes the electric field in the first stage of acceleration, as defined in Equation 6, E3 denotes the electric field in the second ion accelerator stage, as defined in Equation 7, E4 denotes the electric field in the 1$^{st}$ single stage ion mirror, E5 denotes the electric field in the 2$^{nd}$ single stage ion mirror, d2 denotes the length of the 1$^{st}$ field free drift region, d3 denotes the length of the 2$^{nd}$ ion accelerator stage, and d6 denotes the length of the 2$^{nd}$ field free drift region.

Figure 7:
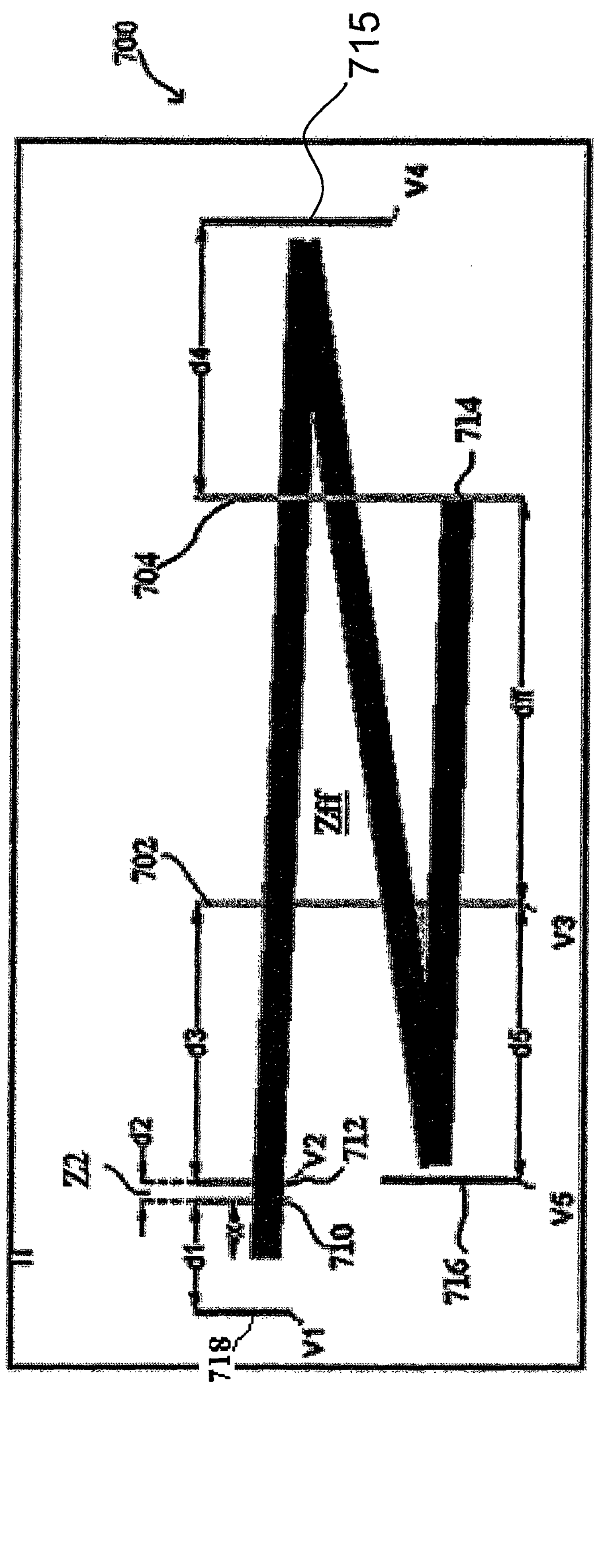
FIG. 7 is a schematic representation of another embodiment of a TOF spectrometer according to the applicants' teachings.

FIG. 7 schematically depicts a TOF 700 according to yet another embodiment according to the applicants' teachings that, similar to the previous embodiment, includes two grids 702 and 704 between which a field free drift region Zff can be established. In addition, similar to the previous two embodiments, a field free drift region Z2 can be established between the two electrodes 710 and 712. Unlike the previous two embodiments, the TOF 700 lacks a long field free region that would extend from one of the grids to the detector. Rather, in this embodiment, a detector 714 can be disposed such that the detector's impact surface shares a plane with the grid 704 (i.e., the detector's impact surface can be coplanar with the grid 704). Hence, the ions reflected by the second ion mirror 716 encounter the detector 714 at the end of their passage through the field free drift region Zff between the grids 702 and 704. The ions enter the TOF 700 through an aperture and are reflected by an electrode 718 held at voltage V1. In some embodiments, the lengths d3, d4 and d5 can be identical while in other embodiments at least two of those lengths can be different.

To obtain the values of d2 and dff for the above TOF 700, d6 can be set to zero in the above Equation 10 presented in connection with the previous embodiment, and dff can be solved instead of d6.

In some implementations of the TOF 700, the ion mirror lengths (i.e., d4 and d5) can be selected to be equal to the length of the second ion accelerator stage (i.e., d3).

The above mathematical relations were utilized to simulate the time-of-flight and trajectories of ions having an amu of 829 through a hypothetical implementation of the above TOF 700 having the following parameters: d1=50 mm, d2=6.38 mm, d3=45 mm, d4=45 mm, d5=45 mm, V1=1500 volts (V), V2=0, V3=−5000 V, V4=900 V, V5=900 V, and dff=364.6 mm, and the ion beam was assumed to be 8 mm wide. The ion flight path was 1.35 m, long enough to realize high performance (8 mm beam was focused to 25 ps, maximum resolution 904,454), and the overall length of the analyzer was about 500 mm. Furthermore, E1=30 V/mm, E3=111.11 V/mm, E4=−131.11 V/mm, and E5=−131.11 V/mm.

Figure 8A:
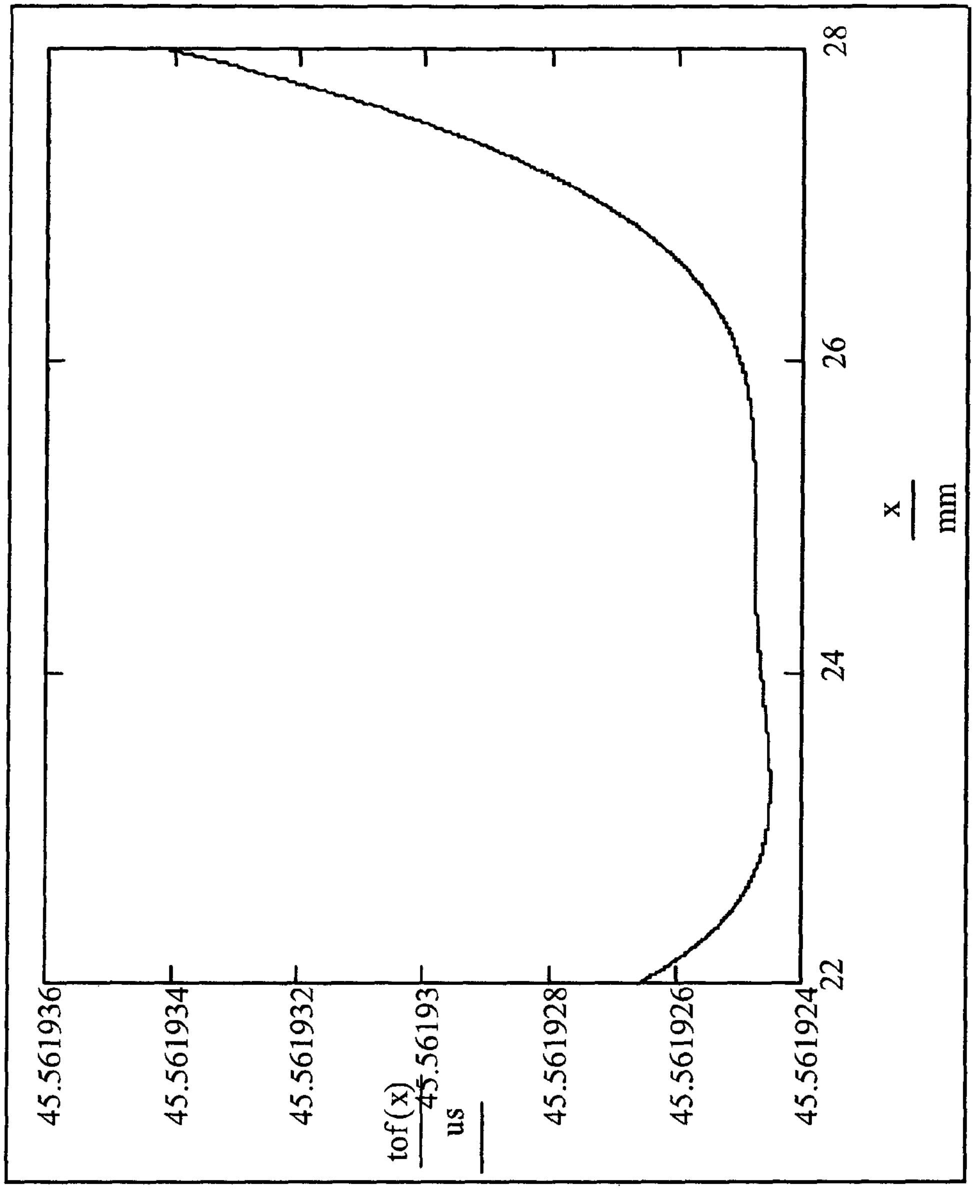
FIG. 8A shows theoretically calculated TOF as a function of ion position in a simulated TOF based on the embodiments shown in FIG. 7.
Figure 8B:
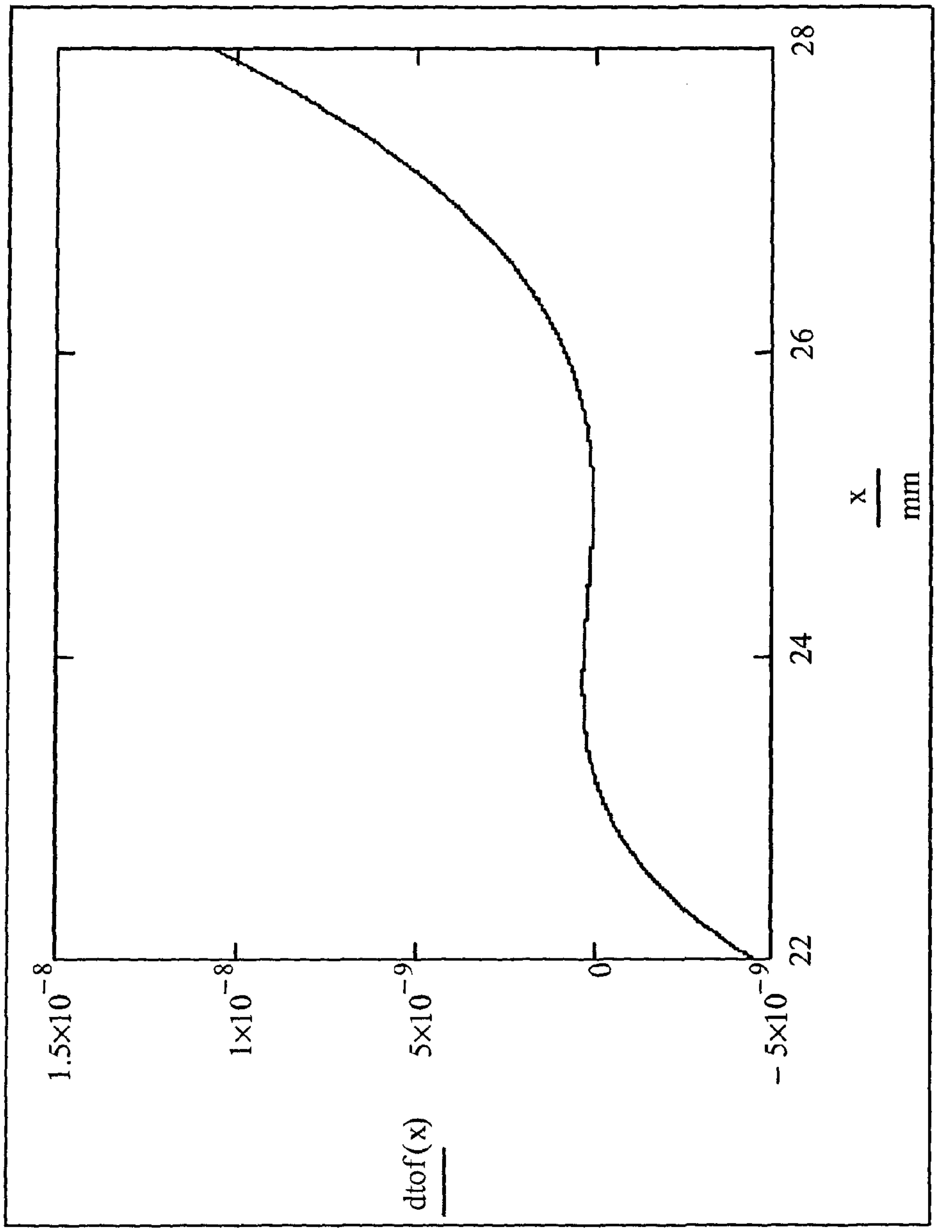
FIG. 8B shows theoretically calculated first derivative of TOF relative to ion position along TOF axis in the simulated TOF mentioned above in connection with FIG. 8A.
Figure 8C:
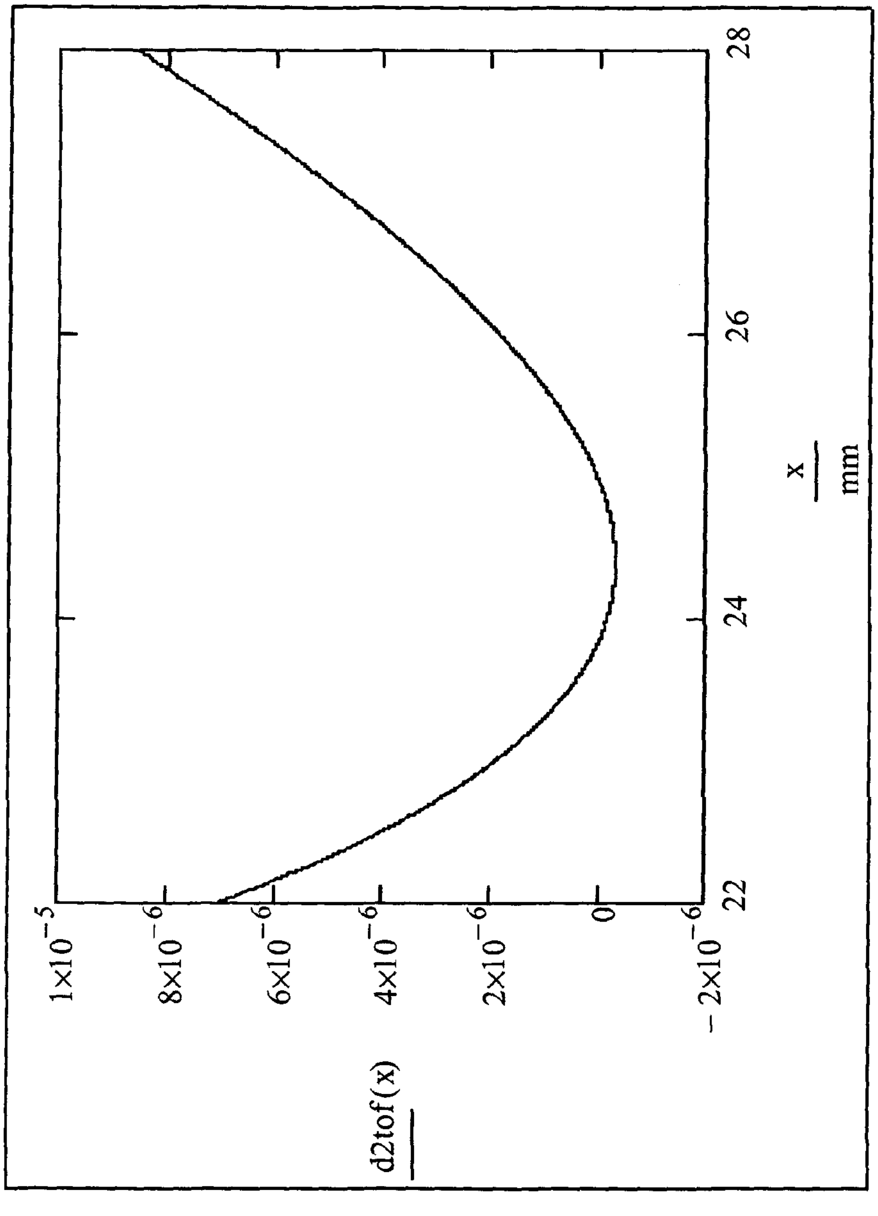
FIG. 8C shows theoretically calculated second derivative of TOF relative to initial ion position along TOF axis in the simulated TOF mentioned above in connection with FIG. 8A.

FIG. 8A shows the ion TOF as a function of ion position along the TOF axis AD, FIG. 8B shows the first derivative of TOF relative to ion position along the TOF axis AD, and FIG. 8C shows the second derivative of TOF relative to ion position along the TOF axis AD. As shown in FIGS. 8B and 8C, the 1$^{st}$ and 2$^{nd}$ order corrections provide a wide and flat region for the initial ion locations (e.g., in this case for ion positions between 24 mm and 26 mm relative to 718) in which the first and second derivatives vanish.

Figure 9:
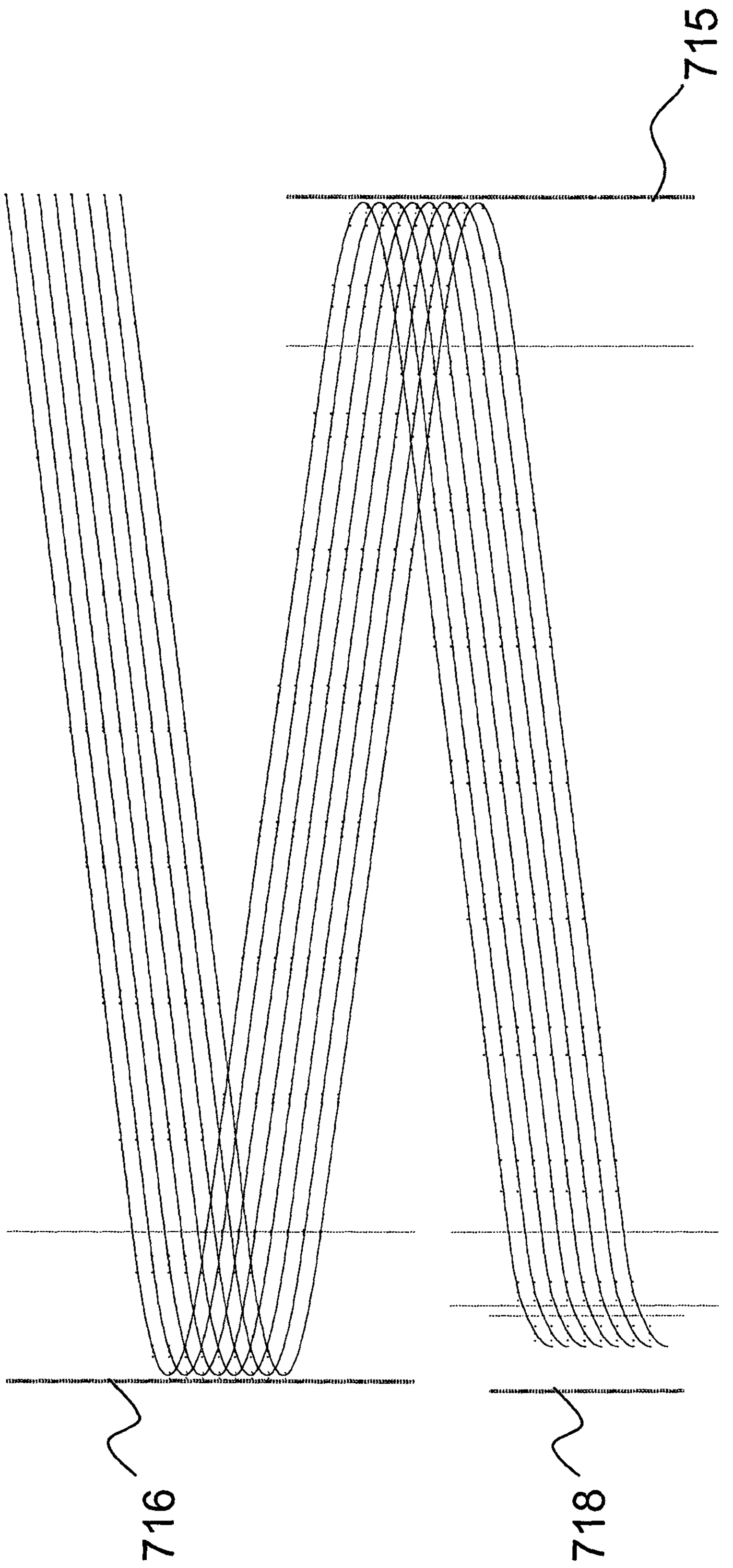
FIG. 9 shows theoretically calculated trajectories for a plurality of ions in the simulated TOF mentioned above in connection with FIG. 8A.
Figure 10:
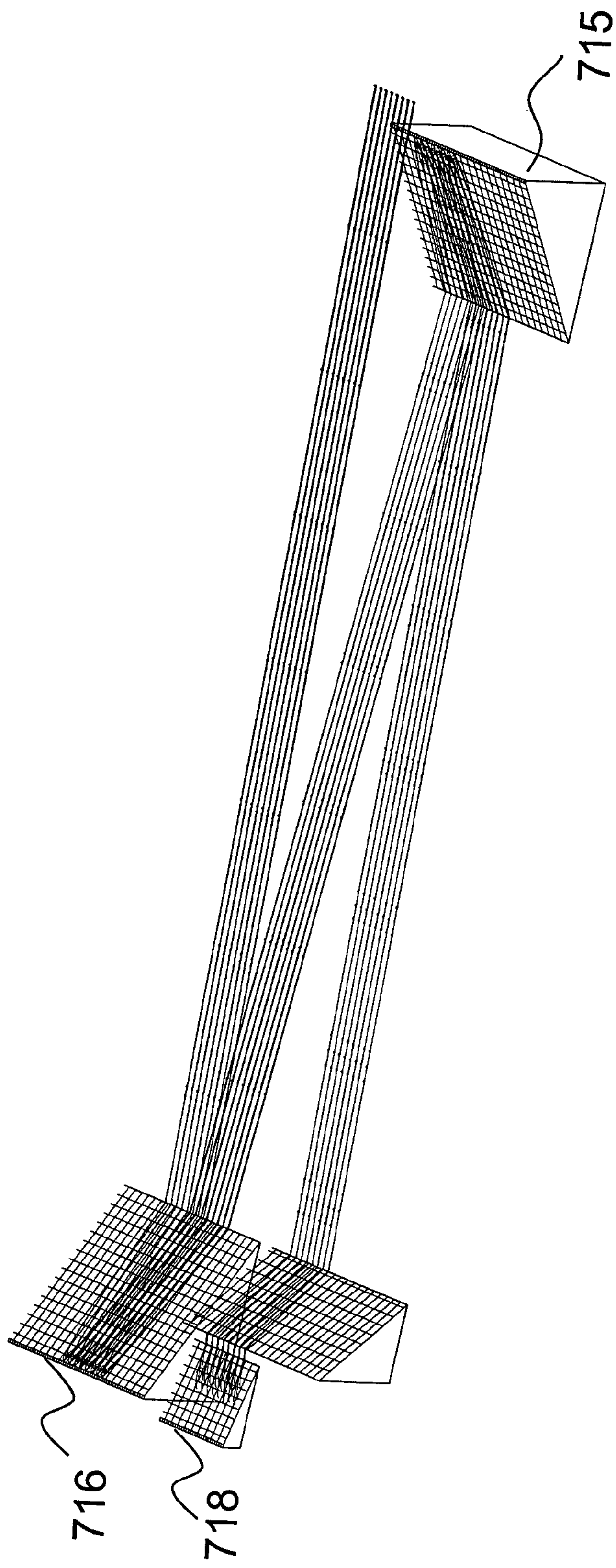
FIG. 10 shows simulated potential energy of a plurality of ions along their trajectories in the simulated TOF mentioned above in connection with FIG. 8A.

FIG. 9 shows calculated trajectories of a plurality ions with 30 eV orthogonal energy as they enter the above simulated TOF spectrometer based on the TOF 700, as well as a range of initial (starting) positions, according to some embodiments of the applicant's teachings. FIG. 10 shows calculated ion trajectories superimposed on a potential energy diagram. The ions come to a tight focus at the plane the impact surface of the detector shares with entrance grid to the first ion mirror.

Other embodiments of TOF spectrometer according to the applicant's teachings can include additional field free drift regions. Further, in some embodiments, one or more of the ion mirrors can be two-stage mirrors. Some of such embodiments can allow for providing higher order corrections and/or for combining spatial and energy focusing.

Figure 11:
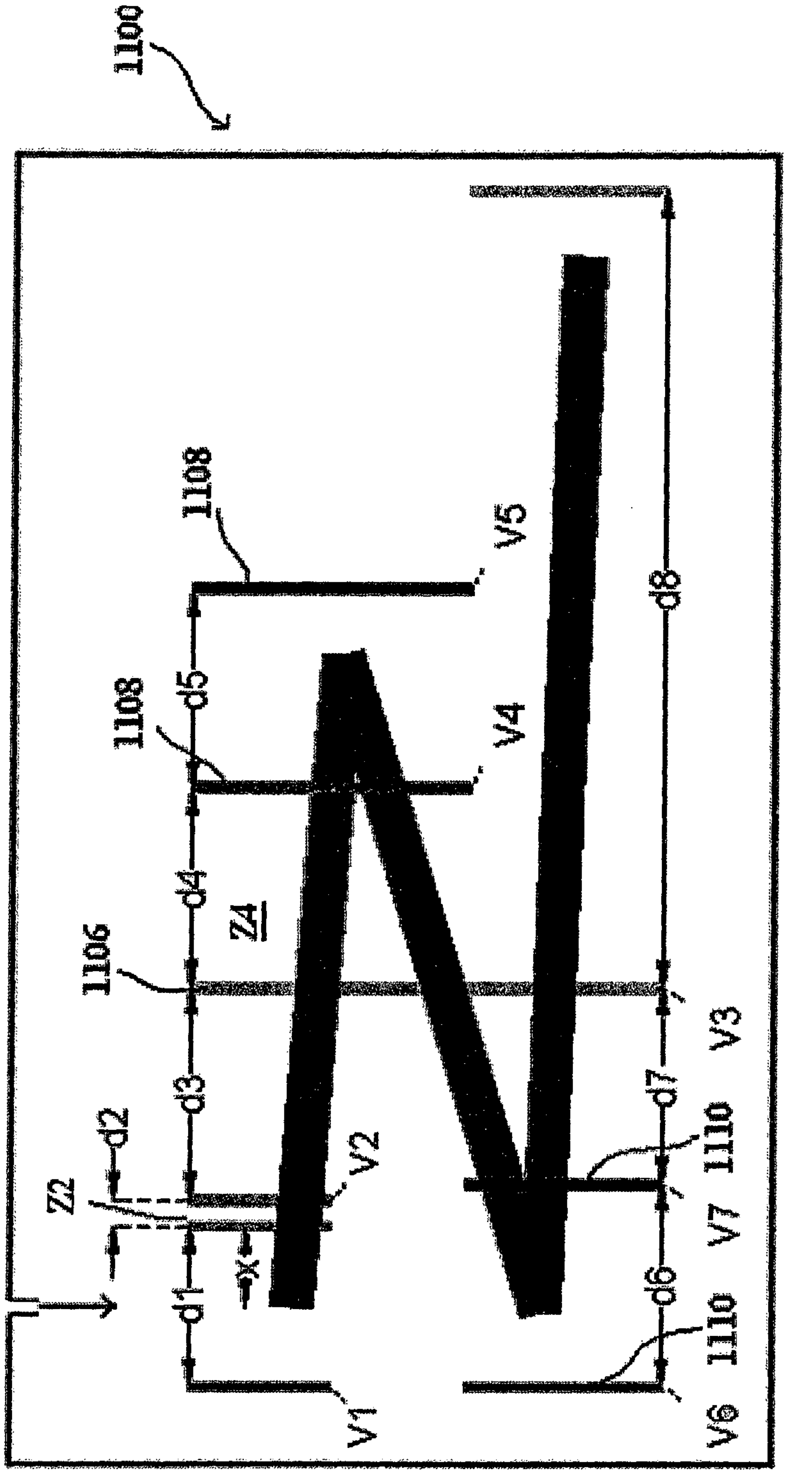
FIG. 11 is a schematic representation of another embodiment of a TOF mass spectrometer according to the applicants' teachings.

By way of example, FIG. 11 schematically depicts a TOF spectrometer 1100 according to one such embodiment that is similar to the embodiment of FIG. 1 in that it comprises two field free regions Z2 and Z4 and a grid 1106 disposed between two ion mirrors 1108 and 1110. However, unlike the embodiment of FIG. 1 in which the ion mirrors are single-stage ion mirrors, in this embodiment, the ion mirrors are two-stage ion mirrors.

Figure 12:
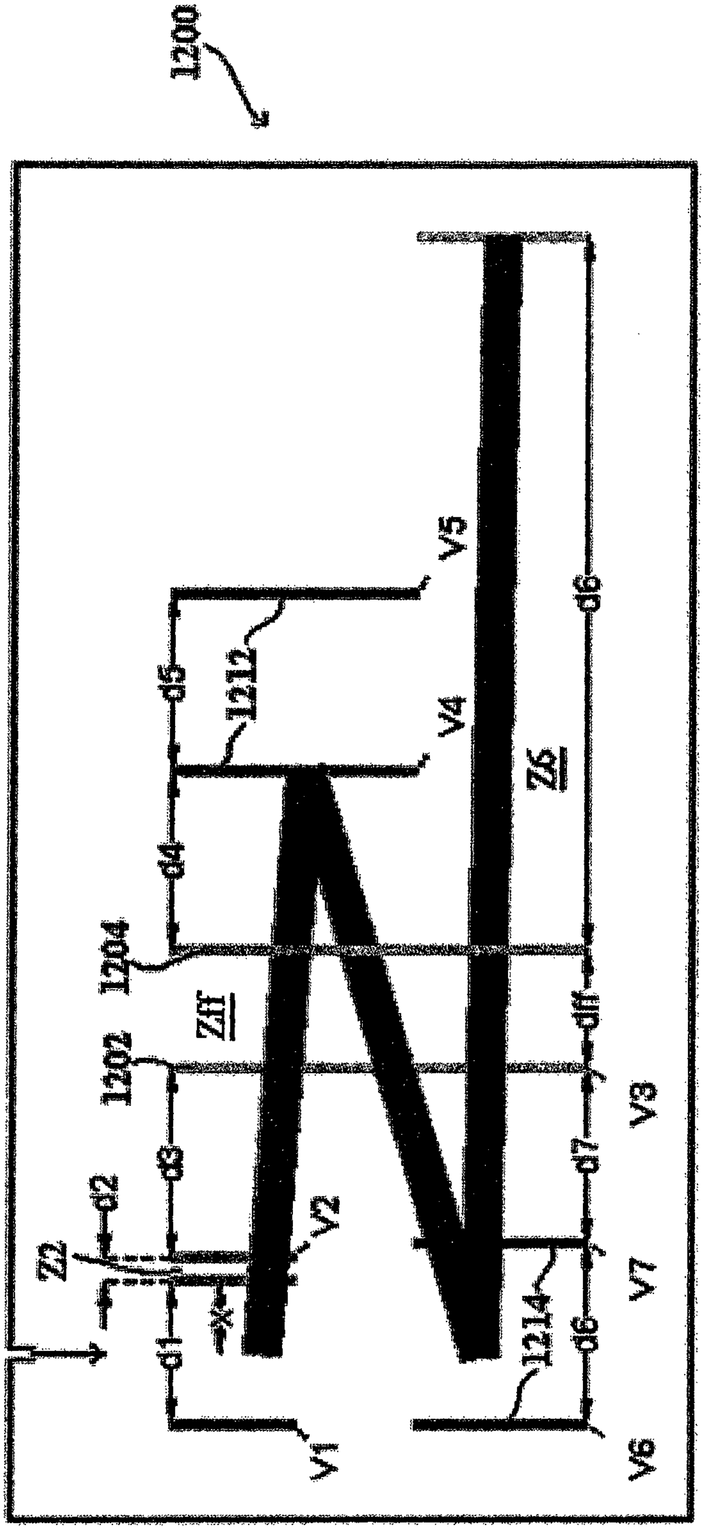
FIG. 12 is a schematic representation of another embodiment of a TOF mass spectrometer according to the applicants' teachings.

By way of another example, FIG. 12. schematically depicts another TOF spectrometer 1200 that is similar to the embodiment shown in FIG. 6 above having two grids 1202 and 1204 between which a field free drift region Zff can be established in addition to the field free drift regions Z2 and Z6. However, unlike the above embodiment of FIG. 6 in which the ion mirrors are single-stage ion mirrors, the TOF 1200 includes two ion mirrors 1212 and 1214, both of which are two-stage ion mirrors.

Figure 13:
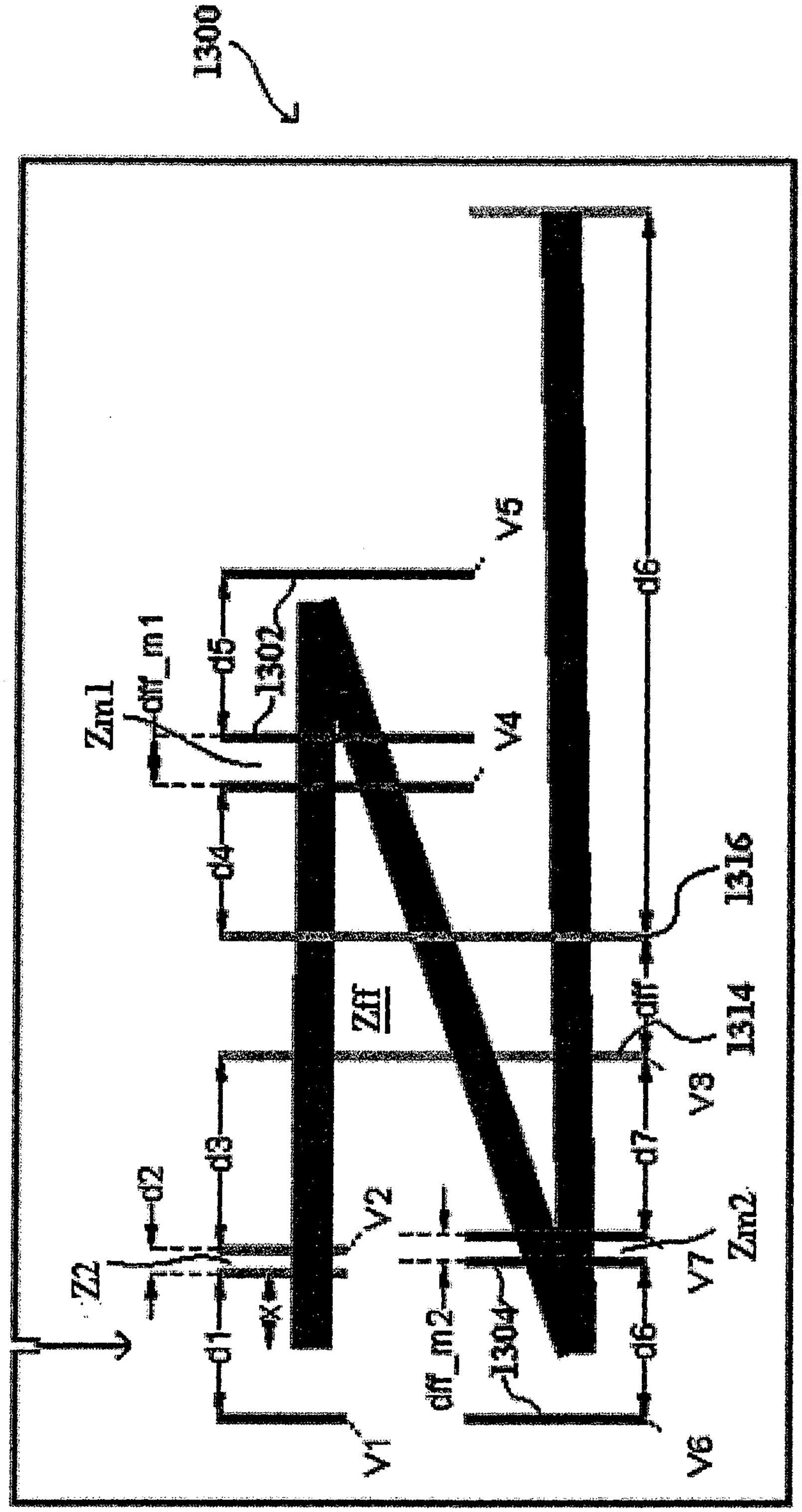
FIG. 13 is a schematic representation of another embodiment of a TOF mass spectrometer according to the applicants' teachings.

FIG. 13 schematically depicts a TOF spectrometer 1300 according to another embodiment that includes two two-stage ion mirrors 1302 and 1304 and four field free drift regions Z2, Zff, Zm1 and Zm2. Each of the two additional field free drift regions Zm1 and Zm2 can be disposed between one of the two-stage ion mirrors and one of the grids 1314 and 1316 between which the field free drift region Zm1 and Zm2 can be disposed.

The above mathematical formalism can be employed to analyze these additional embodiments, e.g., to determine the lengths of the field free drift regions.

The use of ion mirrors in various embodiments, such as those discussed above, to fold the path of the ion beam can allow for implementing the present teachings, including the use of multiple field free regions, in a compact configuration. For example, the use of ion mirrors can allow for utilizing multiple field free regions while maintaining the physical dimensions of the spectrometer within a desired range.

Figure 14:
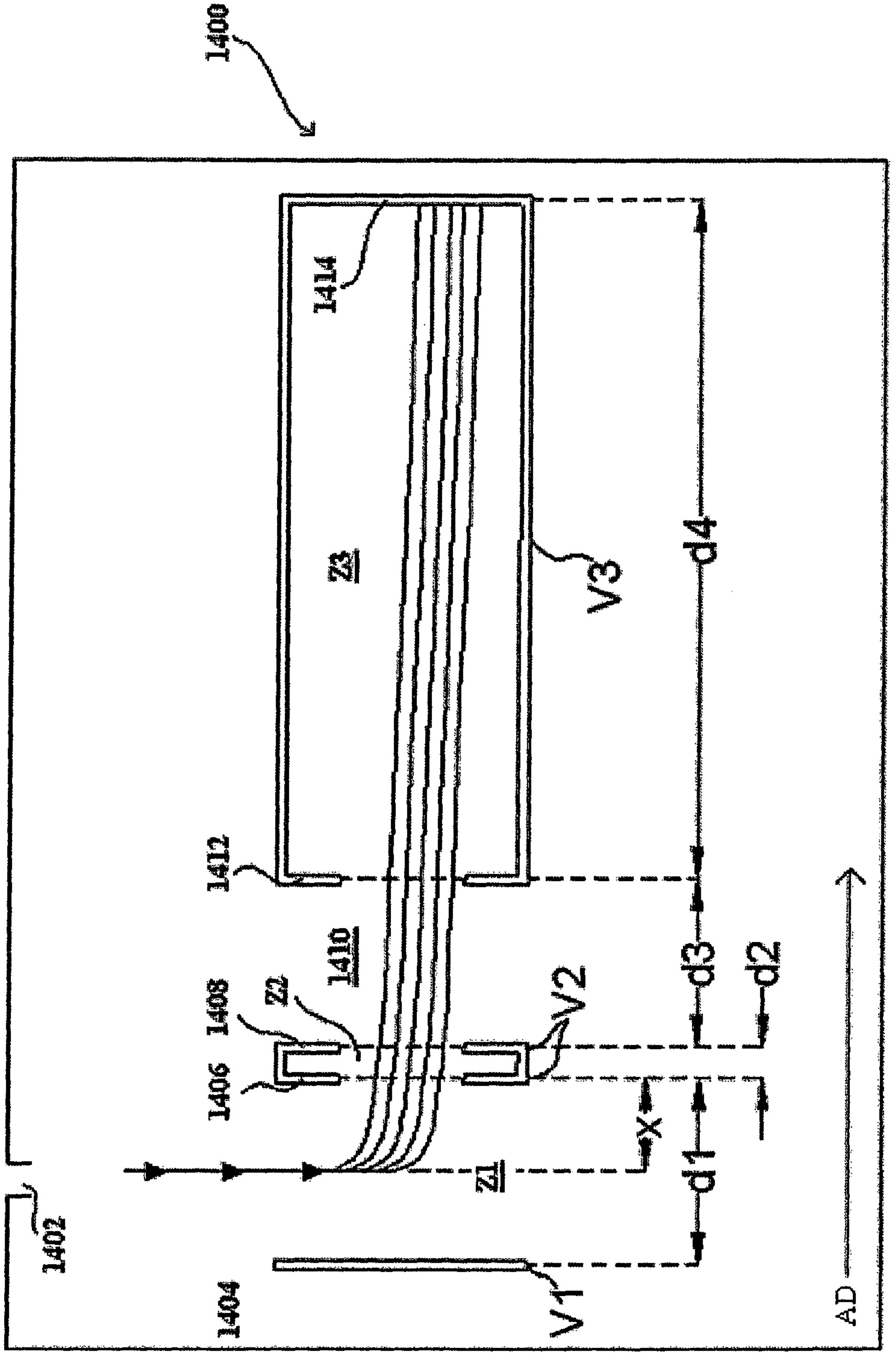
FIG. 14 is a schematic representation of another embodiment of a TOF mass spectrometer according to the applicants' teachings.

Applicant's teachings are, however, not restricted to the above embodiments but can be applied to any TOF geometry. By way of example, FIG. 14 schematically depicts a linear TOF analyzer 1400 according to another embodiment that can comprise an entrance aperture 1402 through which ions enter the analyzer orthogonal to analyzer's axis (AD). A pulsed voltage applied to an electrode 1404 causes a 90-degree deflection of the ions to cause the ions to propagate along the analyzer's axis AD. A voltage differential applied between an electrode 1404 and the electrode 1406 causes acceleration of the ions (first ion acceleration stage Z1). The accelerated ions then enter a first field free drift region Z2 established between the electrode 1406 and another electrode 1408, which are held at a common voltage. After passage through the first field free drift region Z2, the ions are subjected to a second ion acceleration stage Z3, which can be generated by a voltage differential applied between the electrode 1408 and an electrode 1412. The ions then enter a second field free region Z4, which can be much longer than the first field free drift region Z2 and extends to a detector 1414.

Unlike the previous embodiments, the TOF spectrometer 1400 does not include any ion mirrors to cause folding of the ion trajectories as they travel from the analyzer's entrance to the detector.

The lengths of the two field free regions (i.e., d2 and d4) can be determined, as discussed below, to provide $1^{st}$ and $2^{nd}$ order corrections of ion flight time with respect to the initial ion position. In other words, the two field free regions can be configured to provide position focusing of the ions. In this embodiment, the following mathematical relations are employed to derive values for the lengths d2 and d4:

$$TOF(x) = \frac{d2}{\left(v1^2 + 2\cdot x\cdot E1\cdot \frac{q}{\text{mass}}\right)^{\frac{1}{2}}} + \frac{d4}{\left[v1^2 + 2\cdot \frac{q}{\text{mass}}\cdot (x\cdot E1 + d3\cdot E3)\right]^{\frac{1}{2}}} - \frac{\text{mass}}{q}\cdot\frac{v1}{E1} + \ldots \frac{\text{mass}}{q}\cdot\left(\frac{1}{E1} - \frac{1}{E3}\right)\cdot\left(v1^2 + 2\cdot\frac{q}{\text{mass}}\cdot x\cdot E1\right)^{\frac{1}{2}} + \frac{\text{mass}}{q}\cdot\frac{1}{E3}\cdot\left[v1^2 + 2\cdot\frac{q}{\text{mass}}\cdot(x\cdot E1 + d3\cdot E3)\right]^{\frac{1}{2}} \quad \text{Equation 15}$$

wherein:

$$E1 = \frac{V1 - V2}{d1}$$

And $$E3 = \frac{V2 - V3}{d3}$$

$$\frac{\partial TOF(x)}{\partial x} = \frac{1}{E3}\cdot\frac{E1}{\left[v1^2 + 2\cdot\frac{q}{\text{mass}}\cdot(x\cdot E1 + d3\cdot E3)\right]^{\frac{1}{2}}} + \left(\frac{1}{E1} - \frac{1}{E3}\right)\cdot\frac{E1}{\left(v1^2 + 2\cdot\frac{q}{\text{mass}}\cdot x\cdot E1\right)^{\frac{1}{2}}} - \ldots \frac{q}{\text{mass}}\cdot E1\cdot\left[\frac{d2}{\left(v1^2 + 2\cdot\frac{q}{\text{mass}}\cdot x\cdot E1\right)^{\frac{3}{2}}} + \frac{d4}{\left[v1^2 + 2\cdot\frac{q}{\text{mass}}\cdot(x\cdot E1 + d3\cdot E3)\right]^{\frac{3}{2}}}\right] \quad \text{Equation 16}$$

$$-\frac{\partial^2 TOF(x)}{\partial x^2} = 3\cdot E1^2\cdot\left(\frac{q}{\text{mass}}\right)^2\cdot\left[\frac{d2}{\left(v1^2 + 2\cdot\frac{q}{\text{mass}}\cdot x\cdot E1\right)^{\frac{5}{2}}} + \frac{d4}{\left[v1^2 + 2\cdot\frac{q}{\text{mass}}\cdot(x\cdot E1 + d3\cdot E3)\right]^{\frac{5}{2}}}\right] - \ldots E1^2\cdot\frac{q}{\text{mass}}\cdot\left[\frac{1}{E3}\cdot\frac{1}{\left[v1^2 + 2\cdot\frac{q}{\text{mass}}\cdot(x\cdot E1 + d3\cdot E3)\right]^{\frac{3}{2}}} + \left(\frac{1}{E1} - \frac{1}{E3}\right)\cdot\frac{1}{\left(v1^2 + 2\cdot\frac{q}{\text{mass}}\cdot x\cdot E1\right)^{\frac{1}{2}}}\right] \quad \text{Equation 17}$$

$$d2 = \frac{d1}{3}\cdot\left[\left(\frac{d1\cdot E1}{d3\cdot E3} - 1\right)\cdot\left(\frac{2\cdot E1}{E3} - 1\right)\right] \quad \text{Equation 18}$$

$$d4 = \frac{1}{3}\cdot\left(\frac{1}{E1} - \frac{2}{E3}\right)\cdot\frac{(E1\cdot d1 + 2\cdot E3\cdot d3)^{\frac{5}{2}}}{E3\cdot d3\cdot(E1\cdot d1)^{\frac{1}{2}}} \quad \text{Equation 19}$$

Figure 15:
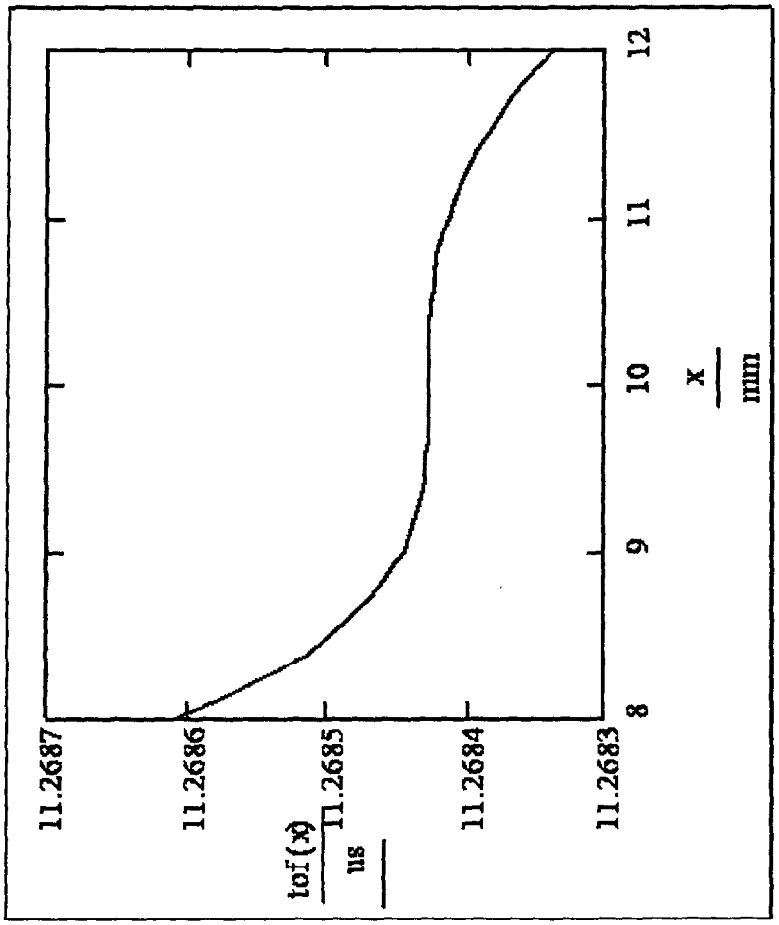
FIG. 15 shows theoretically calculated TOF as a function of initial ion position in a simulated TOF based on the embodiment shown in FIG. 14.

FIG. 15 depicts a calculated TOF for ions traveling through a theoretical implementation of the above linear TOF analyzer for which the first and second order corrections of TOF relative to ion position along the TOF 1400 was provided by using the above Equations 15-19. The parameter of this TOF were as follows: d1=20 mm, d2=3.25 mm, d3=25 mm, d4=339.4 mm, V1=1500V, V2=0V, V3=−6000V.

In some embodiments, two or more field free regions can be employed to provide first and second order corrections for the TOF of ions with respect to a spread in initial ion positions, and one or more ion mirrors can be employed to provide first (and in some cases second order) corrections with respect to a spread in the kinetic energy of the ions. For example, one or more ion acceleration stages together with one or more field free drift regions can be employed to temporally focus ions (bunch up the ions spatially), via correcting for ion position or velocity correlated ion position, at a virtual focus location at the entrance of an ion mirror, and the ion mirror can then be configured to achieve a second order correction of ion flight time relative to variation in ion kinetic energy.

Figure 16:
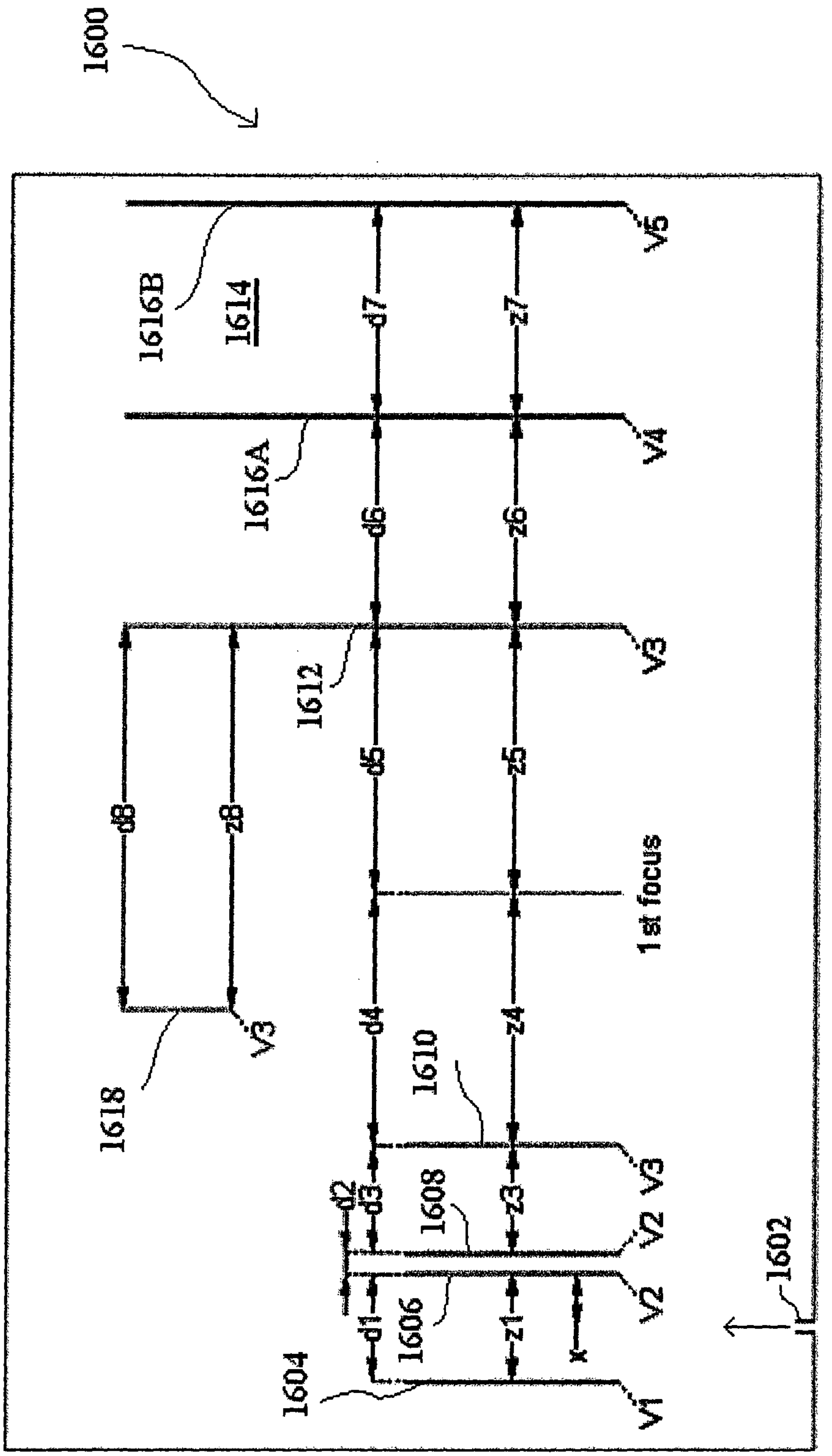
FIG. 16 is a schematic representation of another embodiment of a TOF mass spectrometer according to the applicants' teachings.

By way of example, FIG. 16 schematically depicts a TOF spectrometer 1600 according to such an embodiment in which first and second order corrections of TOF for both ion position and ion energy are provided, but at different locations in the spectrometer. The position correction can be for initial ion position, and the energy correction can be for ion energy variation at the temporal focus of the ion position, which in this embodiment can be at the entrance to the ion mirror. The TOF spectrometer 1600 includes an entrance aperture 1602 through which ions can enter the spectrometer along a direction orthogonal to TOF axis (a direction parallel to the velocity vectors of the ions) of the spectrometer. A deflection electrode 1604 to which a voltage, e.g., a pulsed voltage, can be applied causes the deflection of entering ions onto the TOF axis. A voltage differential applied between the deflection electrode 1604 and another electrode 1606 provides a first acceleration stage Z1. Another electrode 1608 disposed at a distance d2 relative to the electrode 1606 can be held at a common voltage with electrode 1606 such that the space between the two electrodes is a first field free drift region d2. A second ion acceleration stage Z3 can be provided by a voltage differential applied between the electrode 1608 and another electrode 1610 disposed at a distance d3 relative to the electrode 1608. The spectrometer 1600 includes another electrode 1612 disposed at a distance d4+d5 relative to the electrode 1610 and can be held at a common voltage with that electrode, thereby generating a second field free drift region Z4+Z5.

As discussed further below, the lengths d3 and (d4+d5) of the field free drift regions can be configured based on other parameters, e.g., the electric fields within the acceleration regions, to obtain first and second corrections of the TOF relative to initial ion position, thereby temporally focusing the ions in the middle of the second field free drift region Z4+Z5.

Upon exiting the second field free drift region Z4+Z5, the ions enter a two-stage ion mirror 1614. The two-stage ion mirror 1614 can include an electrode 1616A disposed at a distance d6 from the electrode 1612 and another electrode 1616B disposed at a distance d7 from the electrode 1616A. A voltage differential between the electrodes 1612 and 1616A provides a first deceleration of the ions, and a voltage differential between 1616A and 1616B provides a second deceleration of the ions such that the ions come to a stop and reverse direction. The reflected ions are then accelerated by traversing the regions between the electrodes 1616B and 1616A and the electrode 1616A and 1612 to enter a field free drift region Z8 that extends to a detector 1618. The first focal point can be between the two grid elements 1610 and 1612.

In some embodiments, the following mathematical relations can be employed to obtain various system parameters, such as the lengths of the field free regions and the ion energy spread at the virtual focus. The mathematical relations are designed to achieve $2^{nd}$ order correlation focusing from the first acceleration stage to a virtual focus location (labeled $1^{st}$ focus in FIG. 16), and then to achieve $2^{nd}$ order energy focusing from the virtual focus location to the detector. To accomplish this, Newton's equations of motion are applied for ions as they propagate through regions (z1, z3, z6, and z7) in which the ions are subjected to linearly accelerating fields, and field free regions (d2, z4, z5 and z8).

The field strengths in the acceleration regions are determined as the electrostatic field between two parallel conductors held at a potential difference:

$$E1 = \frac{V1 - V2}{d1} \qquad \text{Equation 20}$$

$$E3 = \frac{V2 - V3}{d3} \qquad \text{Equation 21}$$

$$E6 = \frac{V3 - V4}{d6} \qquad \text{Equation 22}$$

$$E7 = \frac{V4 - V5}{d7} \qquad \text{Equation 23}$$

The force on the ion in these (or any) electric field can be given by:

$$F = \text{mass} \cdot a = q \cdot E \qquad \text{Equation 24}$$

Thus, the ion undergoes an acceleration given by:

$$a = \frac{q}{\text{mass}} \cdot E \qquad \text{Equation 25}$$

where the acceleration, a can be written as:

$$\frac{\partial v}{\partial t} = a \qquad \text{Equation 26}$$

For correlation focusing, the following relation can be substituted for position, x:

$$x = mc \cdot v1 + c1 \qquad \text{Equation 27}$$

The new term mc is the slope of the correlation. The unit of measure for mc is time. The following relations can then be obtained for flight times in various regions:

$$t1 = \frac{\text{mass}}{q} \cdot \frac{1}{E1}\left[\left(v1^2 + 2 \cdot \frac{q}{\text{mass}} \cdot E1 \cdot (mc \cdot v1 + c1)\right)^{\frac{1}{2}} - v1\right] \qquad \text{Equation 28}$$

$$t2 = \frac{d2}{\left(v1 + 2 \cdot \frac{q}{\text{mass}} \cdot E1 \cdot (mc \cdot v1 + c1)\right)^{\frac{1}{2}}} \qquad \text{Equation 29}$$

$$t3 = \frac{1}{E3} \cdot \frac{\text{mass}}{q} \cdot \left[\left(v1^2 + 2 \cdot \frac{q}{\text{mass}} \cdot (E1 \cdot (mc \cdot v1 + c1) + d3 \cdot E3)\right)^{\frac{1}{2}} - \left(v1^2 + 2 \cdot \frac{q}{\text{mass}} \cdot E1 \cdot (mc \cdot v1 + c1)\right)^{\frac{1}{2}}\right] \qquad \text{Equation 30}$$

-continued $$t4=\frac{d4}{\left(v1^2+2\cdot\frac{q}{\text{mass}}\cdot(E1\cdot(mc\cdot v1+c1)+d3\cdot E3)\right)^{\frac{1}{2}}}\quad\text{Equation 31}$$

Thus, the total time of flight from the initial ion position to the virtual focus is:

$$TOF=t1+t2+t3+t4\quad\text{Equation 32}$$

Substituting the values for t1, t2, t3 and t4, tof can be written as:

$$TOF(v1)=\frac{d2}{\left(v1^2+2\cdot\frac{q}{\text{mass}}\cdot E1\cdot(mc\cdot v1\cdot c1)\right)^{\frac{1}{2}}}+\frac{d4}{\left(v1^2+2\cdot\frac{q}{\text{mass}}\cdot(E1\cdot(mc\cdot v1+c1)+d3\cdot E3)\right)^{\frac{1}{2}}}+\cdots\frac{\text{mass}}{q}\cdot\left[\frac{1}{E3}\cdot\left(v1^2+2\cdot\frac{q}{\text{mass}}\cdot(E1\cdot(mc\cdot v1+c1)+d3\cdot E3)\right)^{\frac{1}{2}}+\left(\frac{1}{E1}-\frac{1}{E3}\right)\cdot\left(v1^2+2\cdot\frac{q}{\text{mass}}\cdot E1\cdot(mc\cdot v1+c1)\right)^{\frac{1}{2}}-\frac{v1}{E1}\right]\quad\text{[Equation 33]}$$

The first and second derivative of tof with respect to v1 can then be calculated and set to zero:

$$\frac{\partial TOF}{\partial v1}=\frac{\text{mass}}{q}\cdot\left(\frac{1}{E1}-\frac{1}{E3}\right)\cdot\frac{\left(v1+\frac{E1\cdot mc\cdot q}{\text{mass}}\right)}{\left[v1^2+\frac{2\cdot q\cdot E1}{\text{mass}}\cdot(mc\cdot v1+c1)\right]^{\frac{1}{2}}}-\frac{d2\cdot\left(v1+\frac{E1\cdot mc\cdot q}{\text{mass}}\right)}{\left[v1^2+\frac{2\cdot q\cdot E1}{\text{mass}}\cdot(mc\cdot v1+c1)\right]^{\frac{3}{2}}}-\frac{\text{mass}}{q\cdot E1}\cdots\frac{d4\cdot\left(v1+\frac{E1\cdot mc\cdot q}{\text{mass}}\right)}{\left[v1^2+\frac{2\cdot q}{\text{mass}}\cdot[E1\cdot(mc\cdot v1+c1)+E3\cdot d3]\right]^{\frac{3}{2}}}+\frac{\text{mass}\cdot\left(v1+\frac{E1\cdot mc\cdot q}{\text{mass}}\right)}{E3\cdot q\cdot\left[v1^2+\frac{2\cdot q}{\text{mass}}\cdot[E1\cdot(mc\cdot v1+c1)+E3\cdot d3]\right]^{\frac{1}{2}}}\quad\text{Equation 34}$$

-continued $$\frac{\partial^2 TOF}{\partial v1^2}=\frac{\text{mass}}{q\cdot E3}\cdot\frac{\left[v1^2+\frac{2\cdot q}{\text{mass}}\cdot[E1\cdot(mc\cdot v1\cdot c1)+E3\cdot d3]\right]-\left(v1+\frac{E1\cdot mc\cdot q}{\text{mass}}\right)^2}{\left[v1^2+\frac{2\cdot q}{\text{mass}}\cdot[E1\cdot(mc\cdot v1+c1)+E3\cdot d3]\right]^{\frac{3}{2}}}+\cdots d4\cdot\frac{3\cdot\left(v1+\frac{E1\cdot mc\cdot q}{\text{mass}}\right)^2-\left[v1^2+\frac{2\cdot q}{\text{mass}}\cdot[E1\cdot(mc\cdot v1\cdot c1)+E3\cdot d3]\right]}{\left[v1^2+\frac{2\cdot q}{\text{mass}}\cdot[E1\cdot(mc\cdot v1+c1)+E3\cdot d3]\right]^{\frac{5}{2}}}+\cdots d2\cdot\frac{3\cdot\left(v1+\frac{E1\cdot mc\cdot q}{\text{mass}}\right)^2-\left[v1^2+\frac{2\cdot q}{\text{mass}}\cdot E1\cdot(mc\cdot v1+c1)\right]}{\left[v1^2+\frac{2\cdot q}{\text{mass}}\cdot E1\cdot(mc\cdot v1+c1)\right]^{\frac{5}{2}}}+\cdots\frac{\text{mass}}{q}\cdot\left(\frac{1}{E1}-\frac{1}{E3}\right)\cdot\frac{\left[v1^2+\frac{2\cdot q}{\text{mass}}\cdot E1\cdot(mc\cdot v1+c1)\right]-\left(v1+\frac{E1\cdot mc\cdot q}{\text{mass}}\right)^2}{\left[v1^2+\frac{2\cdot q}{\text{mass}}\cdot E1\cdot(mc\cdot v1+c1)\right]^{\frac{3}{2}}}\quad\text{Equation 35}$$

By setting Equations 34 and 35 to zero, values of d2 and d4 can be determined as follows:

$$d2=\frac{d1}{3\cdot E3\cdot d3}\cdots\left[\frac{(E1\cdot d1-E3\cdot d3)\cdot(2\cdot E1-e3)}{E3}+\frac{d1\cdot\left(E1\cdot d1\cdot\frac{\text{mass}}{q}\right)^{\frac{1}{2}}\cdots}{2\cdot E1^2\cdot mc^3}\cdot\left[3\cdot E1^2\cdot mc^2-\frac{\text{mass}}{q}\cdot(E1\cdot d1+2\cdot E3\cdot d3)\right]\right]\quad\text{Equation 36}$$

$$d4=\frac{E1\cdot d1^2}{3\cdot E3^2\cdot d3}\cdot\left(\frac{2\cdot E3\cdot d3+E1\cdot d1}{E1\cdot d1}\right)^{\frac{5}{2}}\cdot\left[(E3-2\cdot E1)+\left(\frac{\text{mass}}{q}\cdot E1\cdot d1\right)^{\frac{1}{2}}\cdot\frac{E3}{(2\cdot E1^2\cdot mc^3)}\cdot\left(d1\cdot\frac{\text{mass}}{q}-3\cdot E1\cdot mc^2\right)\right]\quad\text{Equation 37}$$

In some embodiments, the various voltages and dimensions utilized as parameters in the above equations can set to reasonable values so long as the resultant values of d2 and d4 are real, positive and reasonable to obtain correction for velocity correlated ion position to the second order at the first virtual focus location. In other embodiments, the ion position, rather than velocity correlated ion position, can be employed in the above mathematical relations.

The remainder of the analyzer can be then utilized to correct for spread in ion energy to the second order Again, Newton's equation of motion are employed to determine the ion flight times in the remaining sections of the TOF analyzer.

The equations for the second part of the analyzer can be constructed in energy terms and then differentiated with respect to energy, or can be constructed in terms of position and velocity and then differentiated with respect to position or velocity. Both types of equations are provided below:

$$t5 = d5\cdot\left(\frac{2\cdot U5}{\text{mass}}\right)^{\frac{1}{2}} \quad \text{Equation 38}$$

$$t5 = \frac{d5}{\left[v1^2 + 2\cdot\frac{q}{\text{mass}}\cdot[E1\cdot(mc\cdot v1\cdot c1) + d3\cdot E3]\right]^{\frac{1}{2}}} \quad \text{Equation 39}$$

$$U5 = \frac{1}{2}\cdot\text{mass}\cdot v3^2 \quad \text{Equation 40}$$

$$v3 = \left[v1^2 + 2\cdot\frac{q}{\text{mass}}\cdot[E1\cdot(mc\cdot v1 + c1) + d3\cdot E3]\right]^{\frac{1}{2}} \quad \text{Equation 41}$$

$$t6 = \frac{\text{mass}}{q\cdot E6}\cdot\left(\frac{2\cdot U5}{\text{mass}} + \frac{2\cdot U6}{\text{mass}}\right)^{\frac{1}{2}} - \frac{\text{mass}}{q\cdot E6}\cdot\left(\frac{2\cdot U5}{\text{mass}}\right)^{\frac{1}{2}} \quad \text{Equation 42}$$

$$U6 = q\cdot E6\cdot d6 \quad \text{Equation 43}$$

$$t6 = \frac{\text{mass}}{q\cdot E6}\cdot\left[\left[v1^2 + 2\cdot\frac{q}{\text{mass}}\cdot[E1\cdot(mc\cdot v1 + c1) + d3\cdot E3 + d6\cdot E6]\right]^{\frac{1}{2}} - \left[v1^2 + 2\cdot\frac{q}{\text{mass}}\cdot[E1\cdot(mc\cdot v1 + c1) + d3\cdot E3]\right]^{\frac{1}{2}}\right] \quad \text{Equation 44}$$

$$t7 = -\frac{\text{mass}}{q\cdot E7}\cdot\left(\frac{2\cdot U5}{\text{mass}} + \frac{2\cdot U6}{\text{mass}}\right)^{\frac{1}{2}} \quad \text{Equation 45}$$

$$t7 = \frac{\text{mass}}{q\cdot E7}\cdot\left[v1^2 + \frac{2\cdot q}{\text{mass}}\cdot[E1\cdot(mc\cdot v1\cdot c1) + d3\cdot E3 + d6\cdot E6]\right]^{\frac{1}{2}} \quad \text{Equation 46}$$

$$t8 = \frac{d8}{\left(\frac{2\cdot U5}{\text{mass}}\right)^{\frac{1}{2}}} \quad \text{Equation 47}$$

$$t8 = \frac{d8}{\left[v1^2 + \frac{2\cdot q}{\text{mass}}\cdot[E1\cdot(mc\cdot v1 + c1) + d3\cdot E3]\right]^{\frac{1}{2}}} \quad \text{Equation 48}$$

$$TOF2(U5) = \frac{d5 + d8}{\left(\frac{2\cdot U5}{\text{mass}}\right)^{\frac{1}{2}}} + \left(\frac{1}{E6} - \frac{1}{E7}\right)\cdot\frac{2\cdot mass}{q}\cdot\left(\frac{2\cdot U5}{\text{mass}} + \frac{2\cdot U6}{\text{mass}}\right)^{\frac{1}{2}} - \frac{2\cdot mass}{q\cdot E6}\cdot\left(\frac{2\cdot U5}{\text{mass}}\right)^{\frac{1}{2}} \quad \text{Equation 49}$$

The above equations for the TOF through the $2^{nd}$ part of the analyzer can then be differentiated with respect to U5 ($1^{st}$ and $2^{nd}$ derivatives) and set to zero to obtain the following parameters:

$$\text{sum} = d5 + d8 \quad \text{Equation 50}$$

$$\text{mirror} = \frac{1}{E6} - \frac{1}{E7} \quad \text{Equation 51}$$

-continued $$\frac{\partial TOF(U5)}{\partial U5} = \frac{2\cdot\text{mirror}}{q\cdot\left(\frac{2\cdot U5}{\text{mass}} + \frac{2\cdot U6}{\text{mass}}\right)^{\frac{1}{2}}} - \frac{\text{sum}}{\text{mass}\cdot\left(\frac{2\cdot U5}{\text{mass}}\right)^{\frac{3}{2}}} - \frac{2}{q\cdot E6\cdot\left(\frac{2\cdot U5}{\text{mass}}\right)^{\frac{1}{2}}} = 0 \quad \text{Equation 52}$$

$$\frac{\partial^2 TOF(U5)}{\partial U5^2} = \frac{3\cdot\text{sum}}{\text{mass}^2\cdot\left(\frac{2\cdot U5}{\text{mass}}\right)^{\frac{5}{2}}} + \frac{2}{mass\cdot q\cdot E6\cdot\left(\frac{2\cdot U5}{\text{mass}}\right)^{\frac{3}{2}}} - \frac{2\cdot\text{mirror}}{q\cdot mass\cdot\left(\frac{2\cdot U5}{\text{mass}} + \frac{2\cdot U6}{\text{mass}}\right)^{\frac{3}{2}}} = 0 \quad \text{Equation 53}$$

$$\text{sum} = -\frac{4\cdot U5\cdot U6}{q\cdot E6\cdot(2\cdot U5 + 3\cdot U6)} \quad \text{Equation 54}$$

$$\text{sum} = -\frac{2\cdot d6\cdot(E1\cdot d1 + 2\cdot d3\cdot E3)}{E1\cdot d1 + 2\cdot d3\cdot E3 + 3\cdot d6\cdot E6} \quad \text{Equation 55}$$

$$\text{mirror} = \frac{2\cdot(U5 + U6)}{E6\cdot(2\cdot U5 + 3\cdot U6)}\cdot\left(\frac{U5 + U6}{U5}\right)^{\frac{1}{2}} \quad \text{Equation 56}$$

$$\text{mirror} = \frac{1}{E6}\cdot\frac{E1\cdot d1 + 2\cdot E3\cdot d3 + 2\cdot E6\cdot d6}{E1\cdot d1 + 2\cdot E3\cdot d3 + 3\cdot E6\cdot d6}\cdot\left[\frac{E1\cdot d1 + 2\cdot E3\cdot d3 + 2\cdot E6\cdot d6}{E1\cdot d1 + 2\cdot E3\cdot d3}\right]^{\frac{1}{2}} \quad \text{Equation 57}$$

Since we actually do not set the field value, but a voltage, we can solve for the voltage:

$$V5 = V4 + \frac{d7}{\text{mirror} - \frac{d6}{V3 - V4}} \quad \text{Equation 58}$$

By setting the parameters sum and mirror in accordance with the above equations, the ion energy spread at the virtual focus can be corrected to the second order. The overall TOF equations can be given by the following relation:

$$TOF(v1) = \frac{d2}{\left[v1^2 + 2\cdot\frac{q}{\text{mass}}\cdot E1\cdot(mc\cdot v1 + c1)\right]^{\frac{1}{2}}} + \frac{d4}{\left[v1^2 + 2\cdot\frac{q}{\text{mass}}\cdot[E1\cdot(mc\cdot v1 + c1) + d3\cdot E3]\right]^{\frac{1}{2}}} + \cdots\frac{\text{mass}}{q}\cdot\left(\frac{1}{E1} - \frac{1}{E3}\right)\cdot\left[v1^2 + 2\cdot\left(\frac{q}{\text{mass}}\right)\cdot E1\cdot(mc\cdot v1 + c1)\right]^{\frac{1}{2}} - \frac{\text{mass}\cdot v1}{q\cdot E1} + \cdots\frac{\text{mass}}{q}\cdot\left(\frac{1}{E1} - \frac{1}{E3}\right)\cdot\left[v1^2 + 2\cdot\frac{q}{\text{mass}}\cdot[E1\cdot(mc\cdot v1 + c1) + d3\cdot E3]\right]^{\frac{1}{2}} + \frac{d5 + d8}{\left[v1^2 + 2\cdot\frac{q}{\text{mass}}\cdot[E1\cdot(mc\cdot v1 + c1) + d3\cdot E3]\right]^{\frac{1}{2}}} + \quad \text{Equation 59}$$

-continued $$\cdots \frac{2\cdot mass}{q}\cdot\left(\frac{1}{E5}-\frac{1}{E6}\right)\cdot$$

$$\left[v1^2+2\cdot\frac{q}{\text{mass}}\cdot[E1\cdot(mc\cdot v1+c1)+d3\cdot E3+d6\cdot E6]\right]^{\frac{1}{2}}$$

$$- \cdots$$

$$\frac{2\cdot mass}{q\cdot E6}\left[v1^2+2\cdot\frac{q}{\text{mass}}\cdot[E1\cdot(mc\cdot v1+c1)+d3\cdot E3]\right]^{\frac{1}{2}}$$

Figure 17A:
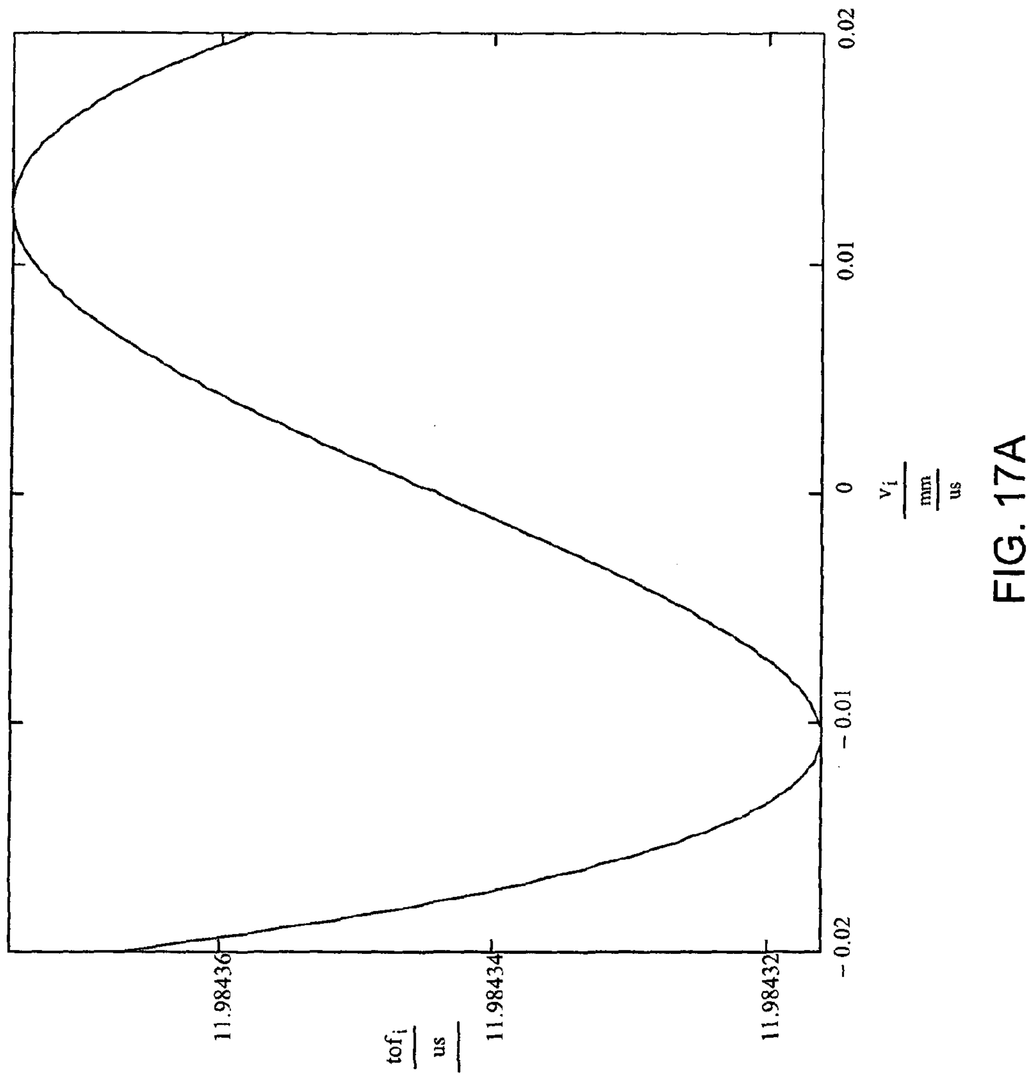
FIG. 17A shows theoretically calculated TOF at the virtual focus location as a function of ion position correlated to ion velocity in a simulated TOF based on the embodiment shown in FIG. 16 with first and second order corrections of TOF relative to the velocity correlated ion position but without second order energy correction for an ion having a mass of 829 amu.
Figure 17B:
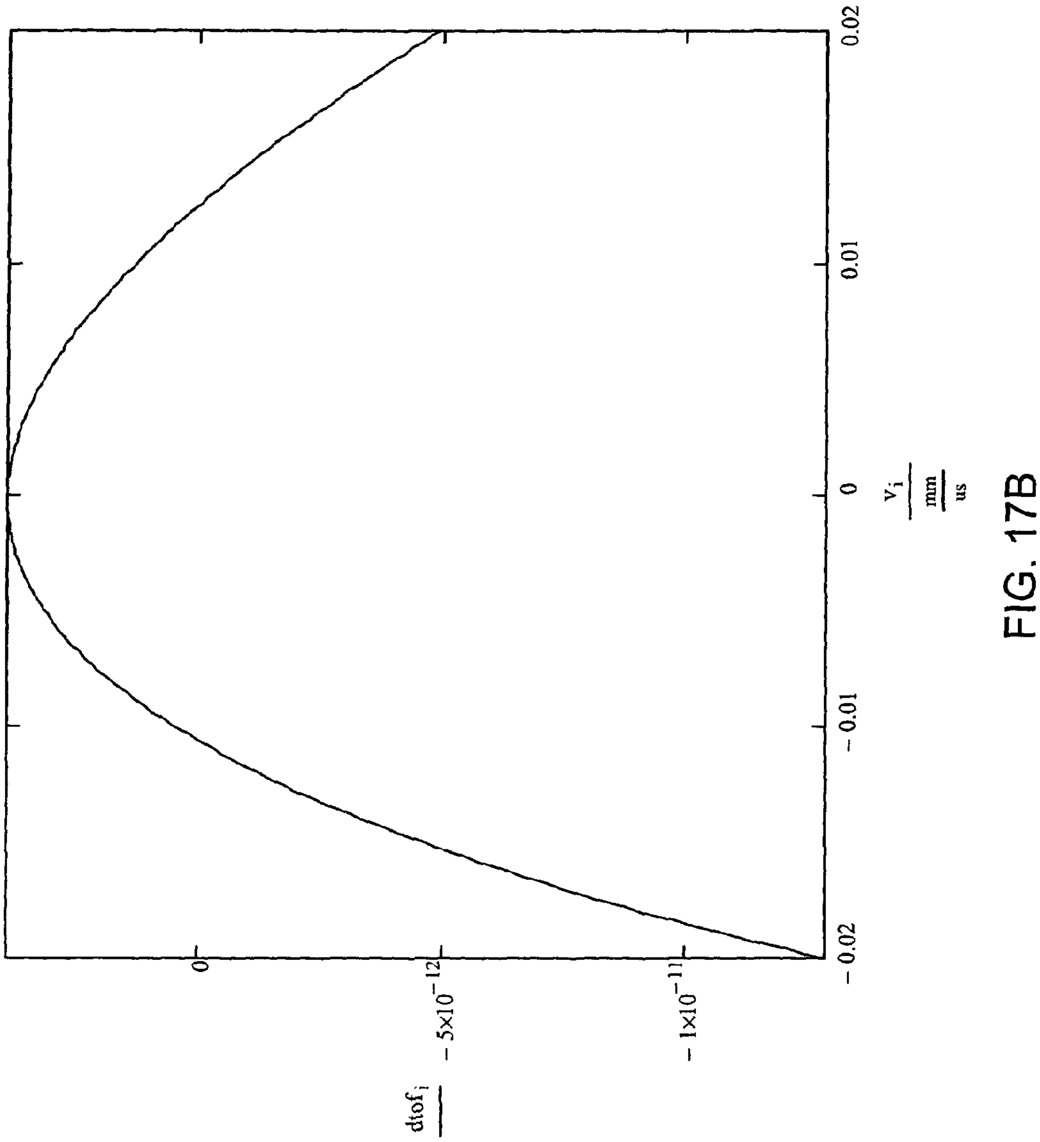
FIG. 17B shows theoretically calculated first derivative of TOF at the virtual focus location as a function of ion position correlated to ion velocity in a simulated TOF mentioned above in connection with FIG. 17A for an ion having a mass of 829 amu with first and second order corrections of TOF relative to the velocity correlated ion position but without second order energy correction.
Figure 17C:
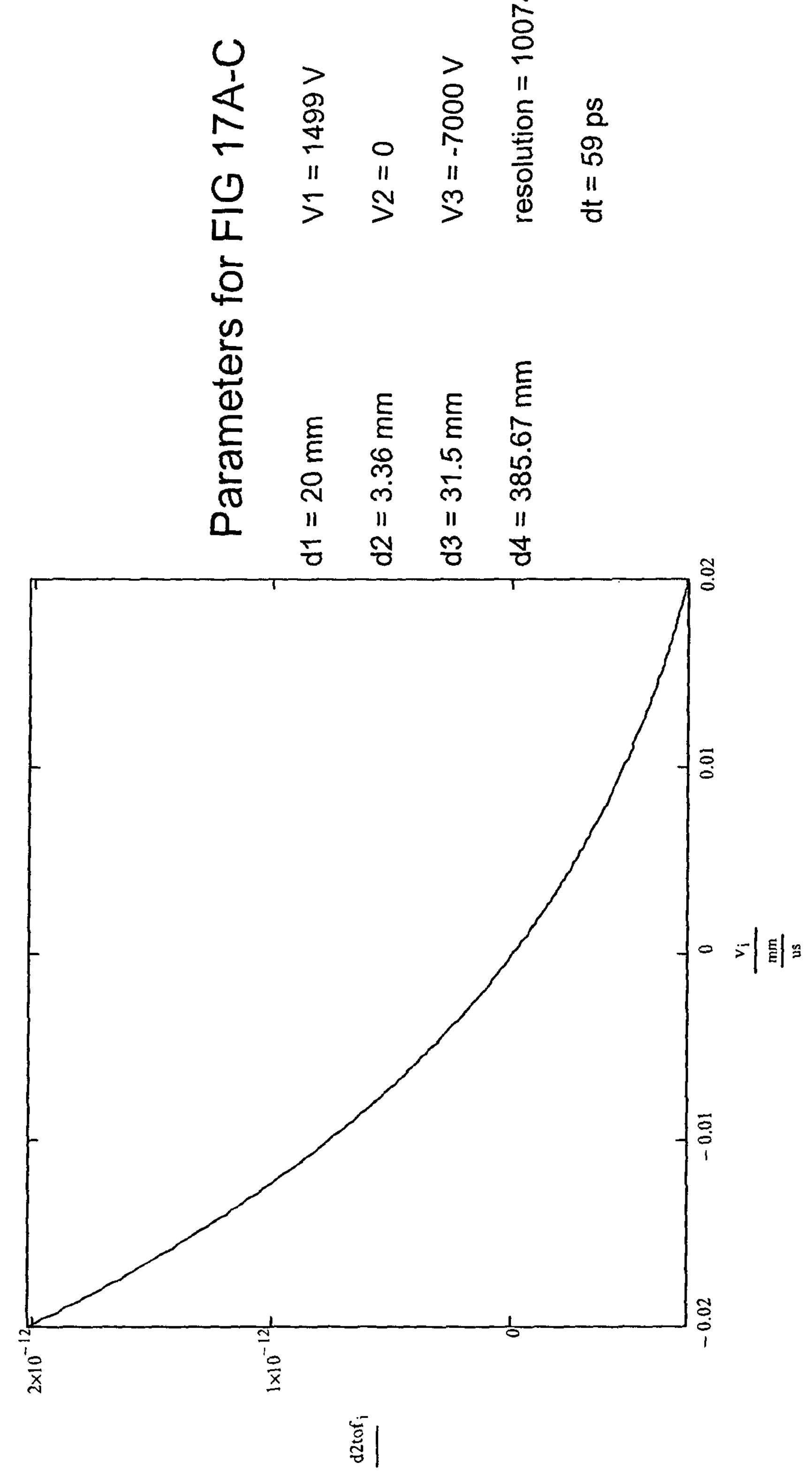
FIG. 17C shows theoretically calculated second derivative of TOF at the virtual focus location as a function of ion position correlated to ion velocity in a simulated TOF axis in the simulated TOF mentioned above in connection with FIG. 17A for an ion having a mass of 829 amu with first and second order corrections of TOF relative to the correlated ion position but without second order energy correction.

FIG. 17A shows TOF as a function of ions velocity correlated initial position (the initial ion positioned can be referenced relative to the deflection electrode 1604), FIG. 17B shows the first derivative of TOF relative to the ion velocity correlated initial position and FIG. 17C shows the second derivative of TOF relative to the ion velocity correlated initial position for a theoretical implementation of the above TOF spectrometer with the following parameters with first and second order corrections of TOF relative to the initial ion position but without second order energy correction for an ion having a mass of 829 amu: d1=20 mm, d2=3 mm, d3=50 mm, d4=500 mm, d5=400 mm, d6=100 mm, d7=50 mm, d8=678 mm, V1=1184 V, V2=0, V3=−7000 V, V4=−1000 V, V5=974 V, length of ion flight=1.941 m, length of analyzer=1123 mm, beam waist=8 mm, kinetic energy of incoming ions:474 eV.

Figure 18A:
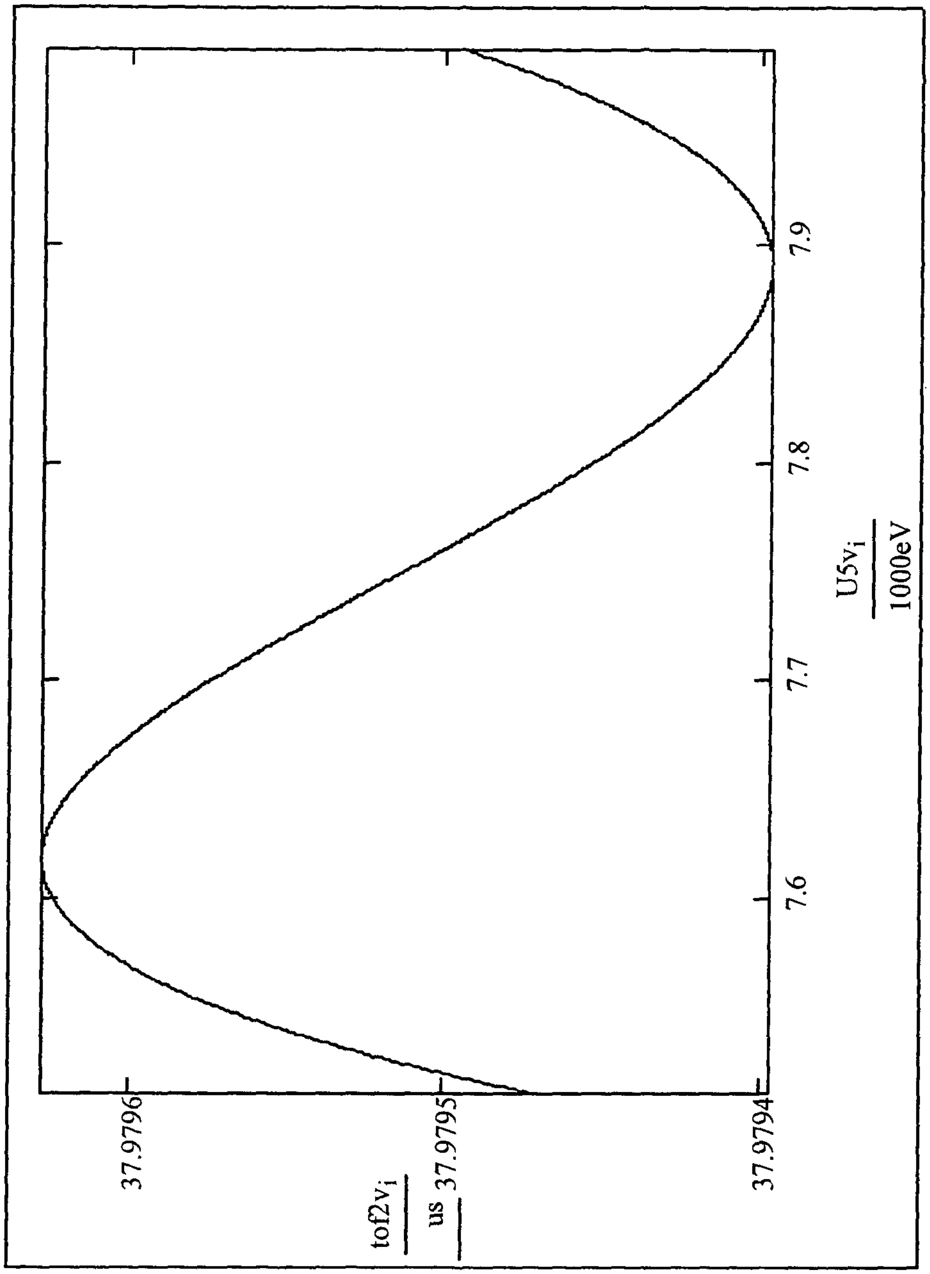
FIG. 18A shows theoretically calculated TOF as a function of ion kinetic energy at the virtual focus location in a simulated TOF based on the embodiment shown in FIG. 16 with second order correction of TOF relative to variation in kinetic energy, the entire kinetic energy distribution that results from the $1^{st}$ and $2^{nd}$ order focusing of the velocity correlated ion position is shown.
Figure 18B:
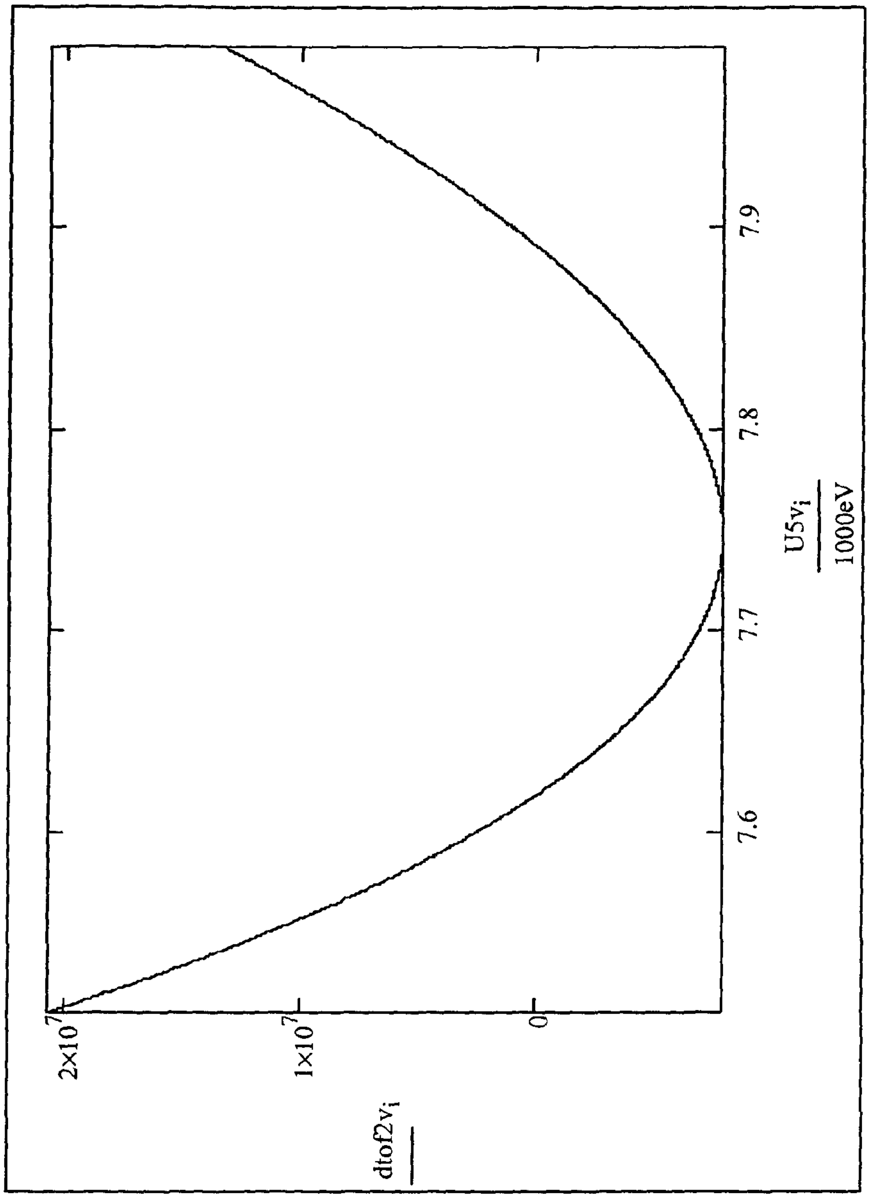
FIG. 18B shows theoretically calculated first derivative of TOF relative to ion kinetic energy at the virtual focus location in the simulated TOF mentioned in connection with FIG. 18A with second order correction of TOF relative to variation in kinetic energy, the entire kinetic energy distribution that results from the $1^{st}$ and $2^{nd}$ order focusing of the velocity correlated ion position is shown.
Figure 18C:
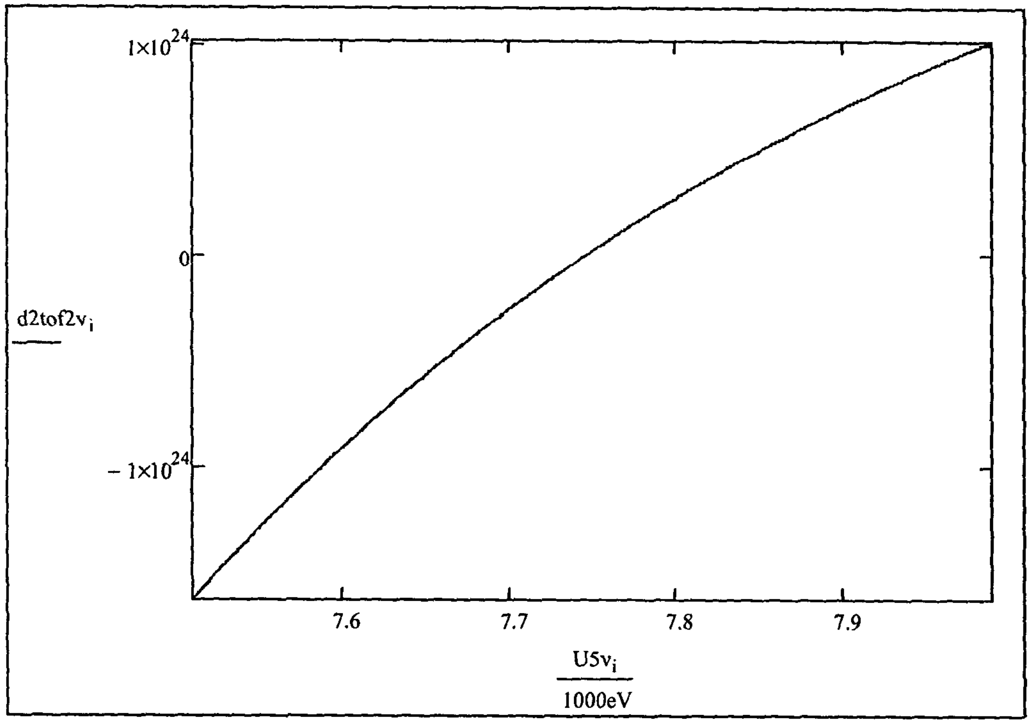
FIG. 18C shows theoretically calculated second derivative of TOF relative to ion kinetic energy at the virtual focus location in the simulated TOF mentioned in connection with FIG. 18A with second order correction of TOF relative to variation in kinetic energy, the entire kinetic energy distribution that results from the $1^{st}$ and $2^{nd}$ order focusing of the velocity correlated ion position is shown.
Figure 19:
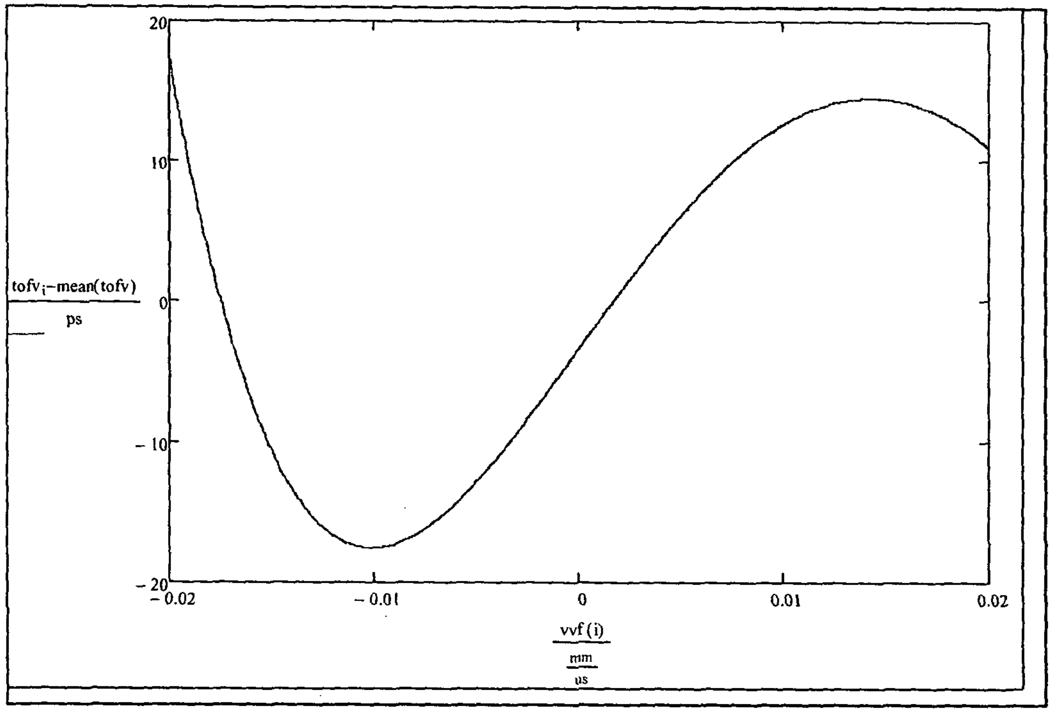
FIG. 19 shows theoretically calculated comprehensive TOF as a function of velocity correlated ion position in a simulated TOF based on the embodiment shown in FIG. 16 with second order corrections both with regard to variation in initial ion position as well as variation in kinetic energy.

FIGS. 18A, 18B, and 18C show respective TOF as a function of ion kinetic energy from the virtual focus location to the detector, first derivative of TOF relative to the ion kinetic energy at the virtual focus location, and second derivative of TOF relative to the ion kinetic energy at the virtual focus location with second order correction of TOF relative to variation in kinetic energy given the range of the kinetic energy spread at the virtual focus location as a consequence of the previous second order correction of TOF with respect to variation in initial velocity correlated ion position for a theoretical implementation of the above TOF spectrometer with the following parameters for an ion having a mass of 829 amu: d1=20 mm, d2=3 mm, d3=50 mm, d4=500 mm, d5=400 mm, d6=100 mm, d7=50 mm, d8=678 mm, V1=1184 V, V2=0, V3=−7000 V, V4=−1000 V, V5=974 V, length of ion flight=1.941 m, length of analyzer=1123 mm, beam waist=8 mm, kinetic energy of incoming ions:474 eV. And FIG. 19 shows the comprehensive TOF given a range of velocity correlated ion positions when both second order corrections for velocity correlated position and energy are implemented, indicating an enhanced performance. This analyzer can focus an velocity correlated beam that has a range of velocity of ±20 m/s to 35 picoseconds at the detector (715,000 theoretical resolution limit). Such a beam will have a dimension of about 3 mm.

Figure 20:
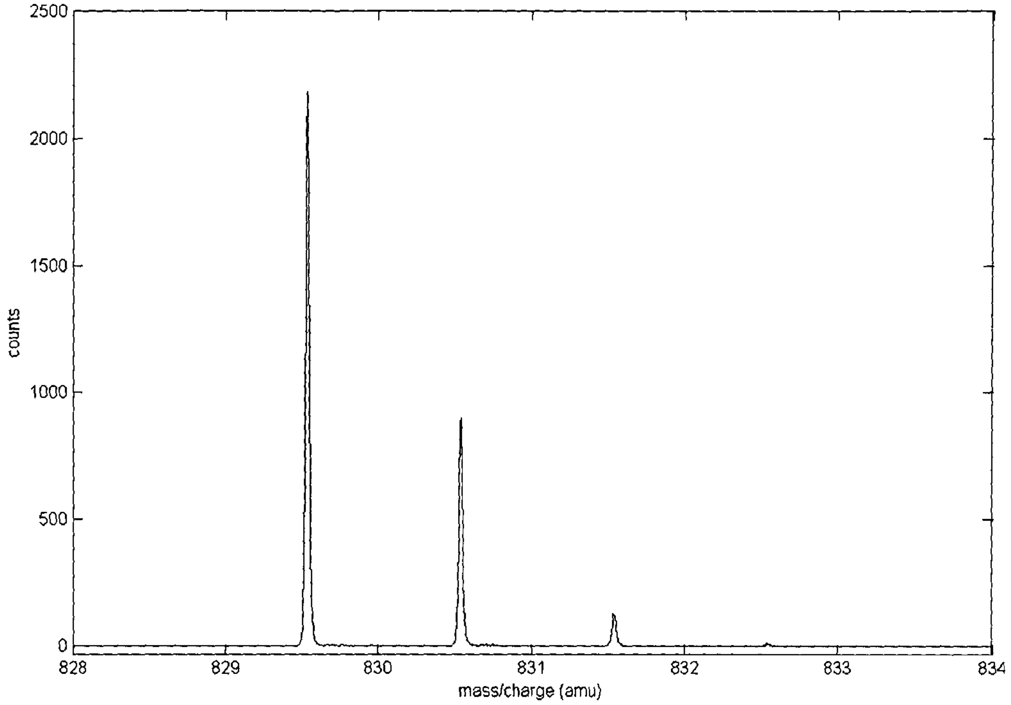
FIG. 20 shows a mass spectrum recorded using a TOF analyzer using the embodiment described in FIG. 16.

FIG. 20 shows an exemplary mass spectrum recorded using a TOF analyzer of protonated ALILTLVS peptide having a mass of 829.5 using an embodiment described by FIG. 16 and Equation 59.

Figure 21:
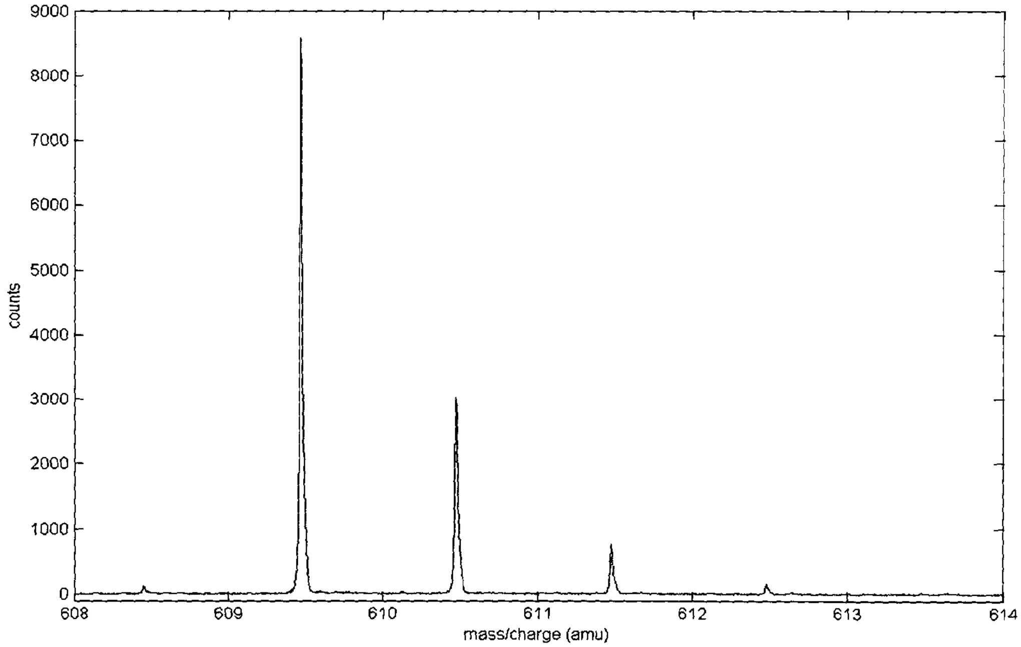
FIG. 21 shows a mass spectrum recorded using a TOF analyzer using the embodiment represented in FIG. 12.

FIG. 21 shows an exemplary mass spectrum recorded using a TOF analyzer of protonated reserpine having a mass of 609.3 using an embodiment described by FIG. 12.

The section headings used herein are for organizational purposes only and are not to be construed as limiting the subject matter described in any way. While the applicant's teachings are described in conjunction with various embodiments, it is not intended that the applicant's teachings be limited to such embodiments. On the contrary, the applicant's teachings encompass various alternatives, modifications, and equivalents, as will be appreciated by those of skill in the art.

The invention claimed is:

1. A time of flight mass spectrometer, comprising:

an input orifice for receiving ions, a first ion acceleration stage for accelerating the ions along a first path, said first acceleration stage comprising first and second electrodes separated by a selected distance, wherein application of a voltage differential between said first and second electrodes generates an electric field for accelerating the ions, a first ion reflector for receiving said accelerated ions and redirecting said ions along a second path different than the first path, a second ion reflector configured to redirect the ions propagating along the second path onto a third path, a detector for detecting at least a portion of the ions redirected by said second ion reflector, at least first and second field free drift regions disposed between said first acceleration stage and said detector, wherein said second field free region is disposed in proximity of the detector, and a second acceleration stage disposed between said first and second field free drift regions, a third electrode disposed at a distance relative to said second electrode, said second and third electrodes being held at a common voltage to generate said first field free drift region there between, a first grid disposed between said third electrode and said first ion reflector, said third electrode and said grid being held at a voltage differential to provide said second acceleration stage for ions traveling along said first path and, wherein said first grid and said first ion reflector are held at a voltage differential configured to decelerate the ions as they propagate from said first grid to said first ion reflector.

2. The mass spectrometer of claim 1, wherein said first and second field free drift regions are configured to correct for a spread in initial positions of ions entering the spectrometer relative to a reference position.

3. The mass spectrometer of claim 2, wherein the detector is positioned to receive the ions propagating along the third path.

4. The mass spectrometer of claim 3, wherein said second field free drift region has a length greater than that of the first field free region.

5. The mass spectrometer of claim 1, wherein said first grid is configured such that the ions intersect said first grid as they propagate along said second path from the first ion reflector to said second ion reflector.

6. The mass spectrometer of claim 5, wherein said voltage differential between said grid and the first reflector causes the ions reflected by the first ion reflector to accelerate as they propagate from the first reflector to the grid along said second path.

7. The mass spectrometer of claim 6, wherein said first grid and said second ion reflector are held at a voltage differential configured to cause the ions to decelerate as they propagate along said second path from the grid to said second reflector.

8. The mass spectrometer of claim 7, wherein said second ion reflector is configured to redirect the ions along said third path toward said grid, and wherein said second field free drift region extends from the grid to said detector.

9. The mass spectrometer of claim 8, wherein a length of said first field free drift region (d2) is provided by the following relation:

$$d2=\frac{E1\cdot d1}{3\cdot E3\cdot d3}.$$

-continued $$\left[(E3\cdot d3-E1\cdot d1)\cdot\left(\frac{1}{E1}-\frac{1}{E3}\right)-\frac{(E1\cdot d1)^{\frac{3}{2}}}{(E1\cdot d1+2\cdot E3\cdot d3)^{\frac{1}{2}}}\cdot\left(\frac{1}{E3}-\frac{4}{E5}\right)\right].$$

10. The mass spectrometer of claim 9, wherein a length of the second field free region (d6) is provided by the following relation:

$$d6=\frac{E1\cdot d1+2\cdot E3\cdot d3}{3\cdot E3\cdot d3}\cdot\left[\frac{(E1\cdot d1+2\cdot E3\cdot d3)^{\frac{3}{2}}}{3\cdot(E1\cdot d1)^{\frac{1}{2}}}\cdot\left(\frac{1}{E1}-\frac{1}{E3}\right)+\left(E3\cdot d3+\frac{E1\cdot d1}{3}\right)\cdot\left(\frac{1}{E3}-\frac{4}{E5}\right)\right].$$

11. The mass spectrometer of claim 5, further comprising a second grid disposed between said first grid and said first ion reflector at a distance (dff) from said first grid, wherein said first and second grids are held at a common voltage to generate a third field free drift region there between.

12. The mass spectrometer of claim 11, wherein a length of the first field free drift region (d2) is provided by the following relation:

$$d2=\frac{E1\cdot d1}{3\cdot E3\cdot d3}\cdot\left[(E3\cdot d3-E1\cdot d1)\cdot\left(\frac{1}{E1}-\frac{1}{E3}\right)-\frac{(E1\cdot d1)^{\frac{3}{2}}}{(E1\cdot d1+2\cdot E3\cdot d3)^{\frac{1}{2}}}\cdot\left(\frac{1}{E3}-\frac{4}{E5}\right)\right].$$

13. The mass spectrometer of claim 12, wherein a length of the second field free drift region (d6) is provided by the following relation:

$$d6=\frac{E1\cdot d1+2\cdot E3\cdot d3}{3\cdot E3\cdot d3}\cdot\left[\frac{(E1\cdot d1+2\cdot E3\cdot d3)^{\frac{3}{2}}}{3\cdot(E1\cdot d1)^{\frac{1}{2}}}\cdot\left(\frac{1}{E1}-\frac{1}{E3}\right)+\left(E3\cdot d3+\frac{E1\cdot d1}{3}\right)\cdot\left(\frac{1}{E3}-\frac{4}{E5}\right)\right]-3\cdot dff.$$

14. A time of flight (TOF) mass spectrometer, comprising:

an aperture for receiving a plurality of ions, at least one acceleration stage for accelerating the received ions along a first path, said at least one acceleration stage comprising first and second electrodes separated by a selected distance, wherein application of a voltage differential between said first and second electrodes generates an electric field for accelerating the ions, two or more field free drift regions configured to provide spatial focusing of the accelerated ions at a selected location, at least one ion reflector for receiving the ions from said selected location and redirecting the ions along a second path different than said first path, a third electrode disposed at a distance relative to said second electrode, said second and third electrodes being held at a common voltage to generate at least one of the two or more field free drift regions there between, a grid disposed between said third electrode and said at least one ion reflector, said third electrode and said grid being held at a voltage differential to provide a second acceleration stage for ions traveling along said first path and wherein said ion reflector is configured to reduce kinetic energy spread of said ions at the spatial focusing location, and wherein said grid and said at least one ion reflector are held at a voltage differential configured to decelerate the ions as they propagate from said first grid to said first ion reflector.

15. The TOF mass spectrometer of claim 14, wherein said at least one ion reflector comprises a two-stage ion reflector.

* * * * *